United States Patent
Hirzel et al.

(10) Patent No.: US 7,067,950 B2
(45) Date of Patent: Jun. 27, 2006

(54) EFFICIENT HIGH-SPEED ELECTRIC DEVICE USING LOW-LOSS MATERIALS

(75) Inventors: Andrew D. Hirzel, Kalamazoo, MI (US); Jeffrey A. Day, Indianapolis, IN (US); Burley C. Semones, Roanoke, VA (US); Mathew R. Johnston, Carmel, IN (US)

(73) Assignee: Light Engineering, Inc., Indianapolis, IN (US)

( * ) Notice: Subject to any disclaimer, the term of this patent is extended or adjusted under 35 U.S.C. 154(b) by 16 days.

(21) Appl. No.: 10/769,094

(22) Filed: Jan. 30, 2004

(65) Prior Publication Data

US 2004/0245879 A1 Dec. 9, 2004

Related U.S. Application Data

(60) Provisional application No. 60/444,271, filed on Jan. 31, 2003, provisional application No. 60/513,892, filed on Oct. 21, 2003.

(51) Int. Cl.
*H02K 1/00* (2006.01)
*H02K 1/12* (2006.01)

(52) U.S. Cl. ..................... 310/216; 310/254
(58) Field of Classification Search ............. 310/254, 310/120, 216, 261, 269; 420/8, 528
See application file for complete search history.

(56) References Cited

U.S. PATENT DOCUMENTS

| 4,187,441 | A * | 2/1980 | Oney ................. 310/112 |
|---|---|---|---|
| 4,394,597 | A | 7/1983 | Mas |
| 4,427,462 | A | 1/1984 | Senno et al. |
| 4,578,610 | A | 3/1986 | Kliman et al. |
| 5,731,649 | A | 3/1998 | Caamano |
| 5,814,914 | A | 9/1998 | Caamano |
| 5,903,082 | A | 5/1999 | Caamano |
| 5,982,070 | A | 11/1999 | Caamano |
| 5,986,378 | A | 11/1999 | Caamano |
| 6,049,197 | A | 4/2000 | Caamano |
| 6,154,013 | A | 11/2000 | Caamano |
| 6,259,233 | B1 | 7/2001 | Caamano |
| 6,407,466 | B1 | 6/2002 | Caamano |
| 6,420,813 | B1 * | 7/2002 | DeCristofaro et al. ...... 310/216 |
| 6,462,456 | B1 * | 10/2002 | DeCristofaro et al. ...... 310/216 |
| 6,603,237 | B1 | 8/2003 | Caamano |
| 6,784,588 | B1 * | 8/2004 | DeCristofaro et al. ...... 310/216 |

(Continued)

OTHER PUBLICATIONS

Claus B. Rasmussen, Iron Losses and Properties of Soft Magnetic Materials for Electric Machines, Aug. 5, 1998, Institution Inst. of Energy Technology, Aalborg University, Denmark.

(Continued)

*Primary Examiner*—Julio Gonzalez
(74) *Attorney, Agent, or Firm*—Ernest D. Buff & Associates, LLC; Ernest D. Buff; Gordon E. Fish

(57) ABSTRACT

The invention relates generally to an electric device, such as an electric motor, a generator, or a regenerative motor, having a wound stator core made from advanced low-loss material. In preferred embodiments, the electric device is an axial airgap-type configuration. The invention provides an electric device having a high pole count that operates at high commutating frequencies, with high efficiency and high power density. Advanced low-loss materials exploited by the present invention include amorphous metals, nanocrystalline metals, and optimized Si—Fe alloys.

42 Claims, 15 Drawing Sheets

U.S. PATENT DOCUMENTS 6,803,694 B1 * 10/2004 Decristofaro et al. ....... 310/216
2004/0212269 A1 * 10/2004 Decristofaro et al. ....... 310/216

OTHER PUBLICATIONS

Ronghai Qu and Thomas A. Lipo, Dual Rotor Radial-Flux Toroidally-Wound Permanent Magnet Machines, Jul. 2002, IEEE, USA.

Jacek F. Gieras, Performance Analysis of a Coreless Permanent Magnet Brushless Motor, Jul. 2002, IEEE, USA.

Luborsky, Becker, Frischmann and Johnson, Potential of Amorphous Alloys for Application in Magnetic Devices, No Date, Symposium on Applications for Magnetism.

* cited by examiner

W = Slot Width

D = Stator Outer Diameter d = Stator Inner Diameter

T = Tooth Height
H = Overall Height

Case 2 Both Machines Same Size:
New Invention Machine higher torque and higher speed range due to design advantage of using higher frequency

EFFICIENT HIGH-SPEED ELECTRIC DEVICE USING LOW-LOSS MATERIALS

CROSS-REFERENCE TO RELATED APPLICATIONS

This application claims the benefit of provisional application Nos. 60/444,271 and 60/513,892, filed Jan. 31, 2003 and Oct. 21, 2003, respectively.

FIELD OF THE INVENTION

The invention relates to an electric device capable of operating at high commutating frequencies, with high efficiency and high power density.

BACKGROUND OF THE INVENTION

The present invention relates generally to an electric device, including, but not limited to, an electric motor, a generator, or a regenerative motor (collectively referred to herein as "electric devices", "electro-magnetic devices", "electric machines", etc.). The term regenerative motor is used herein to refer to a device that may be operated as either an electric motor or a generator. The electric device could be one or more components in a composite device. An example of such a composite device is a compressor comprising one or more electric motors, where the one or more electric motors may be integral with a fan. Preferably, the present invention relates to a highly efficient electric device having improved characteristics. More preferably, the present invention relates to a highly efficient electric device capable of operating at high frequencies.

High Frequency Electric Devices

The electric motor and generator industry is continuously searching for ways to provide motors and generators with increased efficiencies and power densities. The power of an electro-magnetic device is related to the frequency of the device, such that an increase in the frequency of the device increases the power. Thus, machines with higher frequencies are often desired when increased power is desired. The synchronous frequency of a synchronous electric machine can be generally expressed as $f = S \cdot P/2$, where f is the frequency of the machine in Hz, S is the speed in revolutions per second, and P is the pole count of the machine. From this, it is seen that as the speed of the machine increases, the frequency increases, and the power increases. Likewise, as the pole count increases, the frequency of the machine increases, and the power of the machine increases. However, it is significant to note that as the pole count increases, the changes in the magnetic field for the machine also increase, and additional heat is generated within the machine, thereby contributing to the inefficiency of the machine.

Past attempts to manufacture high frequency electric machines (i.e., electric machines with a frequency greater than 300 Hz) typically involved low pole counts at high speeds, since lower pole counts generally help to reduce the core losses, while higher pole counts generally increase the core losses. However, the significant core losses seen with conventional higher pole machines is mainly due to the fact that the material used in the vast majority of old machines is a conventional silicon-iron alloy (Si—Fe), which contains about 3½% or less by weight of silicon. In particular, losses resulting from the changing magnetic fields at frequencies greater than about 300 Hz in conventional Si—Fe-based materials causes the material to heat to the point where the device cannot be cooled by any acceptable means. Accordingly, a commercially viable high frequency electric machine has been difficult to achieve, and therefore it would be desirable to produce a commercially viable high frequency electric machine. It would also be desirable to provide an electric device that can operate simultaneously at a high frequency with a high pole count resulting in a cost-effective electric device having low magnetic core loss and high power density.

Amorphous Metal Magnetic Cores

The advent and subsequent study of amorphous metals has caused many to believe that motors and generators made with amorphous metal magnetic cores have the potential to provide substantially higher efficiencies and power densities compared to conventional motors and generators. In particular, amorphous metals exhibit promising low-loss characteristics, leading many to believe that a stator made with a magnetic core of amorphous metal would result in an electric machine with increased efficiencies. However, previous attempts at incorporating amorphous material into conventional machines failed since these attempts simply involved substituting amorphous material for the silicon-iron in conventional magnetic cores of lower frequency electric machines. This resulted in electric machines having increased efficiencies with less loss, but with a subsequent loss in power output and significant increases in cost associated with handling and forming the amorphous material.

For example, U.S. Pat. No. 4,578,610 discloses a highly efficient motor having a stator constructed by simply coiling a strip of amorphous metal tape, wherein the amorphous strip is wound and then slotted and a suitable stator winding is then placed within the slots.

U.S. Pat. No. 4,187,441 discloses a high power-density machine having spirally wound laminated magnetic cores made from amorphous metal ribbon having slots for receiving stator windings. The patent further discloses using a laser beam for cutting the slots into the amorphous core.

Notwithstanding significant study surrounding the use of amorphous metals in electric machines, to date it has proven very difficult to cost effectively provide a readily manufacturable electric device, which takes advantage of low loss materials, and many have abandoned attempts to develop a commercially viable electric machine having a magnetic core of amorphous metal. Thus it would be desirable to provide a highly efficient electric device, which takes full advantage of the specific characteristics associated with low loss material, thus eliminating the disadvantages associated with the prior art. Preferably, the low-loss material is an amorphous metal, a nanocrystalline metal, an optimized Si—Fe alloy, a grain-oriented Fe-based material or a non-grain-oriented Fe-based material.

SUMMARY OF THE INVENTION

An electro-magnetic device as disclosed herein includes a magnetic field assembly, such as a rotor, and a stator assembly. The stator assembly has a magnetic core made from low loss, high frequency material. Preferably, the stator's magnetic core is made of amorphous metals, nanocrystalline metals, optimized Si—Fe alloys, grain-oriented Fe-based materials or non-grain-oriented Fe-based materials. The introduction of amorphous metals, nanocrystalline metals, optimized Si—Fe alloys, grain-oriented Fe-based materials or non-grain-oriented Fe-based materials into electrical devices enables the device's frequency to be increased above 300 Hz with only a relatively small increase in core loss, as compared to the large increase exhibited in conventional machines, thus yielding a highly efficient electric device capable of providing increase power. The invention provides a highly efficient electric device with a high pole count capable of providing increased power density, improved efficiency, and a more square torque-speed curve.

An axial-airgap electro-magnetic device is disclosed herein comprising at least one stator assembly including a unitary magnetic core having a number of slots. The slots are wound with stator windings. The unitary magnetic core is formed from a low-loss soft-magnetic material characterized by a core loss less than "L" where L is given by the formula $L=12 \cdot f \cdot B^{1.5}+30 \cdot f^{2.3} \cdot B^{2.3}$, where L is the loss in W/kg, f is the frequency in KHz, and B is the magnetic flux density in peak Tesla. Examples of low loss soft magnetic material appropriate for use in the magnetic core includes amorphous metal, nanocrystalline metal and optimized Si—Fe alloy. The electro-magnetic device also includes at least one rotor assembly including a plurality of rotor poles. The rotor assembly is arranged and disposed for magnetic interaction with the at least one stator. The frequency of the electro-magnetic device is higher than 300 Hz during operation of the device.

DETAILED DESCRIPTION OF THE INVENTION

Figure 1A:
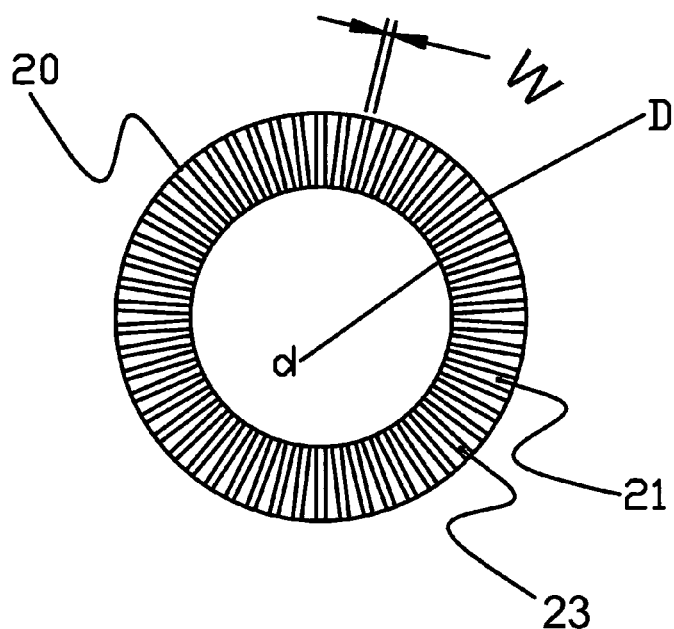
FIGS. 1A, 1B: Illustration of stator structure.

Preferred embodiments of the present invention will be explained in greater detail hereinafter, with reference to the accompanying drawings. The present invention involves the design and/or manufacture an electric device, such as a brushless motor, having a wound stator core made from low-loss material. Preferably the stator core is comprised of one of several advanced low-loss magnetic materials, including amorphous metals, nanocrystalline metals, optimized Si—Fe alloys, grain-oriented Fe-based materials or non-grain-oriented Fe-based materials. The following paragraphs provide examples of these advanced low-loss magnetic materials and a short discussion concerning each example. A common definition for such advanced low-loss materials follows.

Advanced Low-Loss Materials

The introduction of amorphous, nanocrystalline, optimized Si—Fe alloy, grain-oriented Fe-based, or non-grain-oriented Fe-based material into the electrical device enables the machine's frequency to be increased above 300 Hz with only a relatively small increase in core loss, as compared to the large increase exhibited in conventional machines using conventional magnetic core materials, such as Si—Fe alloys. The use of the low-loss materials in the stator core allows the development of the high-frequency, high pole count, electric devices capable of providing increased power density, improved efficiency, and a more square torque-speed curve.

Amorphous Metals

Amorphous metals are also known as metallic glasses and exist in many different compositions. Metallic glasses are formed from alloys that can be quickly quenched without crystallization. Amorphous metal differs from other metals in that the material is very thin, i.e., 2 mils (two thousandths of an inch) or less in thickness and extremely brittle, thus making the material difficult to handle. A suitable amorphous material applicable to the present invention is Metglas® 2605SA1, sold by Metglas Solutions which is owned by Hitachi Metals America, Ltd. (see http://www.metglas.com/products/page5 1 2 4.htm for information on Metglas 2605SA1).

Amorphous metals have a number of recognized disadvantages relative to conventional Si—Fe alloys. The amorphous metals exhibit a lower saturation flux density than conventional Si—Fe alloys. The lower flux density yields a motor with lower power densities (according to the conventional methods). Another disadvantage of amorphous metals is that they possess a lower coefficient of thermal transfer than for the conventional Si—Fe alloys. As the coefficient of thermal transfer determines how readily heat can be conducted to a cool location, a lower value of thermal coefficient could result in greater problems for conducting away waste heat (due to core losses) when cooling the motor. Conventional Si—Fe alloys exhibit a lower coefficient of magnetostriction than amorphous metals. A material with a lower coefficient of magnetostriction undergoes smaller dimensional change under the influence of a magnet field, which in turn would result in a quieter machine. Additionally, the amorphous metal is more difficult to process, i.e., be stamped, drilled, or welded, in a cost effective manner than is the case for conventional Si—Fe.

In spite of these disadvantages of amorphous materials, such amorphous metals can be used to successfully provide a electric machine that operates at high frequencies (i.e., frequencies greater than about 300 Hz). This is accomplished through exploiting the advantageous qualities of the amorphous metals over the conventional Si—Fe alloys. The amorphous metals exhibit much lower hysteresis losses at high frequencies, which results in much lower core losses. The much lower electric conductivity of the amorphous metals, which results in lower amplitude of eddy currents, also leads to lower core losses. Additionally, the ribbon or sheet thickness for amorphous metals is typically much smaller than for conventional Si—Fe alloys, which also lowers the eddy currents and the core losses. Use of amorphous metals can successfully provide an electric device that operates at high frequencies through compensating for the disadvantages of the amorphous metals, while exploiting the advantageous qualities of the amorphous metal, such as the lower core loss.

Silicon-Iron Alloys

As used herein, conventional Si—Fe refers to silicon-iron alloys with a silicon content of about 3.5% or less of silicon by weight. The 3.5 weight percentage limit of silicon is imposed by the industry due to the poor metalworking material properties of Si—Fe alloys with higher silicon contents. The core losses of the conventional Si—Fe alloy grades resulting from operation at a magnetic field with frequencies greater than about 300 Hz are roughly ten times that of amorphous metal, causing the conventional Si—Fe material to heat to the point where a conventional machine cannot be cooled by any acceptable means. However, some grades of silicon-iron alloys, herein referred to as optimized Si—Fe, would be directly applicable to producing a high-frequency machine.

Optimized Si—Fe alloys are defined as silicon-iron alloy grades comprising greater than 3.5% of silicon by weight. The preferred optimized Si—Fe alloys comprises about 6.5%+/−1% of silicon by weight. The objective of the optimization process is to obtain an alloy with a silicon content that minimizes the core losses. These optimized Si—Fe alloy grades are characterized by core losses and magnetic saturation similar to those of amorphous metal. A disadvantage of optimized Si—Fe alloys is that they are somewhat brittle, and most conventional metalworking technologies have not proven feasible in manipulating the material. However, the brittleness and workability issues surrounding optimized Si—Fe are somewhat similar to those of amorphous metal, and the design methodology used for application of amorphous metal is very close to that used for optimized Si—Fe.

Conventional rolling techniques used to make conventional Si—Fe are generally not used to make optimized Si—Fe. However, other techniques known in the industry are used to make optimized Si—Fe. For example, milled optimized Si—Fe alloys can be made by milling techniques known in the art. However, it has not proven acceptable for mass production. Optimized Si—Fe alloys is also being manufactured through a proprietary vacuum vapor deposition process by JFE Steel Corporation, Japan. A composition of iron or silicon-iron is coated with silicon vapor under vacuum conditions, and the silicon is allowed to migrate into the material. The vacuum vapor deposition process is controlled to achieve the optimum content of 6.5% of Si by weight. While optimized Si—Fe alloy derived from vapor deposition is more brittle than conventional SiFe, it is less brittle than the milled optimized Si—Fe. The optimized Si—Fe is commercially available from JFE as "Super E-Core," and is sold as a high-performance 6.5%-silicon magnetic steel sheet.

Nanocrystalline Metals

Nanocrystalline materials are polycrystalline materials with grain sizes up to about 100 nanometers. The attributes of nanocrystalline metals as compared to conventional course grained metals include increased strength and hardness, enhanced diffusivity, improved ductility and toughness, reduced density, reduced modulus, higher electrical resistance, increased specific heat, higher thermal expansion coefficients, lower thermal conductivity, superior soft magnetic properties. Preferably, the nanocrystalline metal is an iron-based material. However, the nanocrystalline metal could also be based on other ferromagnetic materials, such as cobalt or nickel. An exemplary nanocrystalline metal with low-loss properties is Hitachi's Finemet FT-3M. Another exemplary nanocrystalline metal with low-loss properties is Vitroperm 500 Z available from Vacuumschmelze GMBH & Co. of Germany.

Grain-Oriented and Non-Grain-Oriented Metals

The grain-oriented Fe-based material results from mechanical processing of Fe-based material by methods known in the art. The grain-orientation refers to the physical alignment of the intrinsic material properties during the rolling processes to produce thinner and thinner metal, such that the grains of the resulting volume of material possess a preferential direction of magnetization. The magnetization of the grains and magnetic domains are oriented in the direction of the rolling process. This domain orientation allows the magnetic field to be more readily reversible in the direction of orientation, yielding lower core losses in that preferred direction. However, the core losses increase in the direction orthogonal to the preferred orientation, and could prove to be a disadvantage in electric device applications.

Non-grain-oriented Fe-based materials have no preferred direction of magnetic domain alignment. The non-grain-oriented Fe-based material is not amorphous, in that is possesses some amount of crystallinity. Presently available conventional silicon steel has some crystal structure, because it is cooled slowly, which results in some crystallization, and then thinned. However, unlike grain-oriented Fe-based materials such as conventional silicon steel, the non-grain-oriented Fe-based material has a more isotropic magnetization. Preferably, the non-grain-oriented Fe-based materials applicable to the present invention would have thicknesses less than 5 mils.

Defining Advanced Low Loss Materials

The core loss of soft magnetic materials can generally be expressed by the following modified Steinmetz equation:

$$L = a \cdot f \cdot B^b + c \cdot f^d \cdot B^e, \text{ where}$$

L is the loss in W/kg, f is the frequency in KHz,

B is the magnetic flux density in peak Tesla, and a, b, c, and d and e are all loss coefficients unique to the soft magnetic material.

Each of the above loss coefficients a, b, c, d and e, can generally be obtained from the manufacturer of a given soft magnetic material. As used herein, the term "advanced low loss materials" includes those materials characterized by a core loss less than "L" where L is given by the formula $L = 12 \cdot f \cdot B^{1.5} + 30 \cdot f^{2.3} \cdot B^{2.3}$, where L is the loss in W/kg, f is the frequency in KHz, and B is the magnetic flux density in peak Tesla.

FIGS. 6–11 provide charts showing the core loss (as defined by the equation $L = a \cdot f \cdot B^b + c \cdot f^d \cdot B^e$) of various soft magnetic materials versus either the magnetic flux density or the frequency, at various frequencies ranging from 0.4 kHz to 2.0 kHz and various magnetic flux densities ranging from 0.5 Tesla to 1.5 Tesla. The loss coefficients for each of the materials shown in FIGS. 6–11 is provided in table 1 below:

TABLE 1

LOSS COEFFICIENTS

| Loss Coeff | Isotropic Powder, Hoeganes Somalloy 500, +.05% Kenolube | Typical 26 gauge M19, non-grain-oriented | Grain-oriented. 0.014" Orthosil M6 29 gauge El 1/2 Thomas & Skinner | "Advanced Materials" Defined Loss Limit | Vapor Deposited 6.5% Si, JFE Super E, 0.10 mm | Amorphous, Metglas 2605SA1, advertised literature | Nanocrystalline, VAC Vitroperm 500 Z | Nano-Crystalline, Hitachi Finemet FT-3M |
|---|---|---|---|---|---|---|---|---|
| a | 40.27 | 11.39 | 38.13 | 12.00 | 10.77 | 0 | 0 | 0.00 |
| b | 2.15 | 1.62 | 2.37 | 1.50 | 1.85 | 0 | 0 | 0 |
| c | 141.24 | 112.43 | 14.19 | 30.00 | 7.83 | 6.5 | 0.84 | 1.05 |
| d | 1.15 | 1.72 | 3.66 | 2.30 | 1.93 | 1.51 | 1.5 | 1.15 |
| e | 1.46 | 2.01 | 2.14 | 2.30 | 1.85 | 1.74 | 1 | 2.32 |

Each of the above materials is a soft magnetic material comprised primarily of an iron based alloy. Each of the coefficients noted in the tables above are available from the manufacturers of the materials or may be derived from the material specifications available from the manufacturers of the materials, and the coefficients are generally included on the spec sheets for the materials. To this end, each manufacturer of soft magnetic materials will typically participate in industry standard ASTM testing procedures that produce the material specifications from which the coefficients for the Steinmetz equations may be derived.

As can be seen in FIGS. 6–11, a threshold line segment is plotted to show the loss equation that defines the loss threshold for "advanced low loss materials". Materials having a loss equation plotted above this threshold are not "advanced low loss materials". Materials having a loss equation plotted at or below this threshold are defined herein as "advanced low loss materials" or "advanced materials". As can be seen from FIGS. 6–11, the advanced low loss materials include, without limitation, amorphous metals, nanocrystalline alloys, and optimized Si—Fe. In the following paragraphs of disclosure a description of a highly efficient electro-magnetic machine constructed from such advanced low-loss materials is provided. The plots provided in FIGS. 6–11 are shown for frequencies ranging from 0.4 kHz to 2.0 kHz and flux densities ranging from 0.5 Tesla to 1.5 Tesla because these are typical ranges for operation of the electric machines described herein. However, the electric machines described herein are not limited to operation in such ranges.

General Device Structure

The present invention provides an electric device which includes one or more stators and one or more magnetic field assemblies, such as rotors. The one or more stators are formed from advanced low-loss materials, such as amorphous metal, nanocrystalline metal, optimized Si—Fe alloy, grain-oriented Fe-based material or non-grain-oriented Fe-based material. In preferred embodiments, the stators and magnetic field assemblies of the electric device are in an axial-type configuration.

Figure 1B:
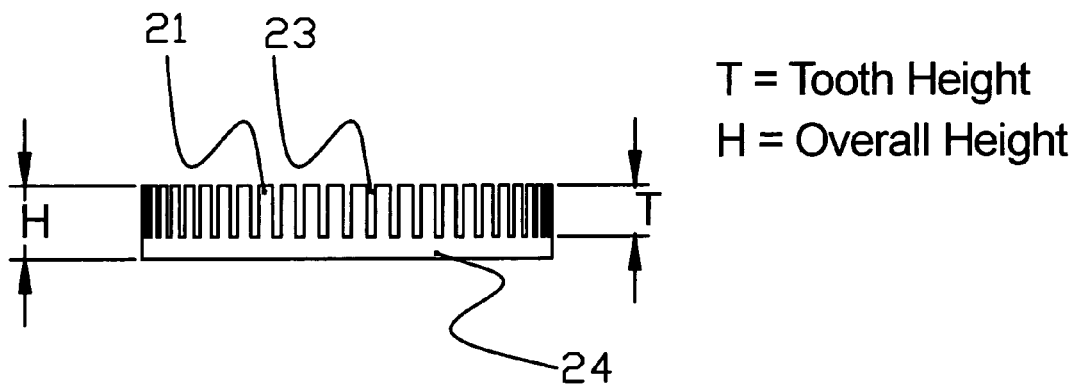

FIGS. 1A and 1B illustrate a top and side view, respectively, of a stator according to one embodiment of the invention. A ribbon of the advanced low-loss material is wound into a large toroid to form the stator metal core 20. These ribbons are typically 0.10 mm (0.004") or less in thickness. The toroid wound from the ribbon has an inside diameter and an outer diameter when viewed in the axial direction, which inside and outside diameters define a surface area known as the total area (TA). The metal core is then machined with slots 23 to form a unitary magnetic core of the stator (discussed in further detail below). The slots reduce the surface area of metal core.

FIG. 1A illustrates the inner diameter (d) and outer diameter (D) of the stator core 20 and also illustrates the slots 23 of outer width (w) that have been machined into the metal core 20 to form the stator. The surface area left after the removal of the slots is called the low-loss metal area. In preferred embodiments where the low-loss material is an amorphous metal, the low-loss metal area is also referred to as the amorphous metal area (AMA). The metal core has an inside circumference that defines inner diameter (d): The inside circumference is not continuous on the slotted portion. Instead, the inside circumference that traverses the slots has gaps where the slots are located. These slots are designed to hold stator windings. Each of the remaining portions of the core inside circumference (i.e., the individual extensions from the backiron 24) is called a tooth 21.

FIG. 1B shows the height (T) of the teeth 21 as it compares to the overall height (H) of the stator 20. The overall height includes the height of the backiron 24 plus the height of the teeth 21. There are equal numbers of teeth 21 and slots 23. In preferred embodiments, the narrowest part of a tooth is not less than 0.100 inch. The area that is removed when the stator is slotted can be filled with potting and/or varnish compounds, or thin organic insulation materials, along with the conducting stator winding, as is known in the art.

As mentioned previously, the stator core is comprised of advanced low loss material and is "unitary" in construction in one embodiment. As used herein, a stator core that is "unitary" in construction is one that is does not require the assembly of two or more subcomponents to complete the stator core. In addition, the unitary stator core disclosed herein is also a "uni-body" stator core. As used herein, the term "uni-body" (or "unibody") refers to a stator core that is layered from a thin ribbon of soft magnetic material to form a base shape and material is then removed from the base shape to form the stator core (e.g., the base shape is slotted to form teeth on the stator core). Unfortunately, advanced low loss materials tend to be extremely brittle, and making a uni-body stator core has proven to be difficult. Nevertheless, several companies, including some manufacturers of advanced low loss materials, have manufactured such stators made of advanced low loss materials using various processes, such as wire electro-discharge machining, laser cutting, electrochemical grind, or conventional machining.

Although the stator cores described herein are uni-body stator cores of unitary construction, various types of non-unitary and non-uni-body stator cores are contemplated for use in the electric machines described herein. For example, a "uni-body" stator core is possible that is subsequently cut into segments, making the resulting stator core not "unitary". Likewise, a "unitary" stator core may be formed by molding an advanced material into the form of a stator core, including any teeth, but because the stator core is not wound from a thin ribbon to form a base shape with subsequent removal of material from the base shape, the resulting stator core would not be "uni-body".

Figure 2:
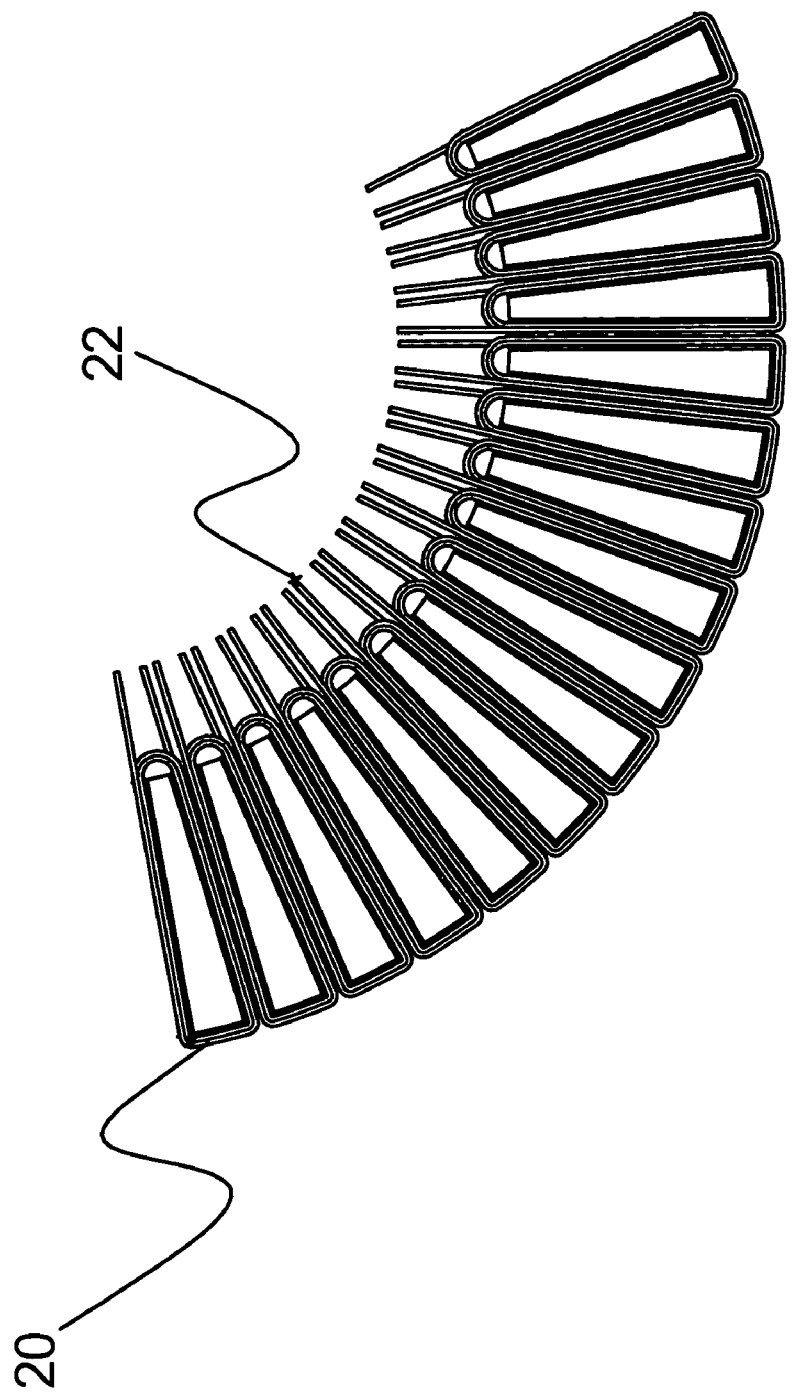
FIG. 2: Illustration of stator winding.

FIG. 2 illustrates a unitary, unibody stator core 20 that has been wound with stator windings 22. The stator 20 wound with stator windings 22 is placed into a toroidal housing and potted with an appropriate organic dielectric. It is possible to wire multiple slots into a common magnetic section, which corresponds to a slot per phase per pole (SPP) value of about 0.5, where the SPP ratio is determined by dividing the number of slots in a stator core by the number of phases in the stator winding and the number of DC poles (SPP=slots/phases/poles). The slotted area which is not taken up by the windings, i.e., the potting, varnish and insulation material areas, is the waste area (WA). The difference between the total area and the waste area is called the useful area. In a preferred embodiment, where the SPP=0.5, the percent of the useful space allocated to conducting windings will be 35%+/−10%, or close to that percentage, which optimizes the power density (watts output)/(cubic centimeters) of the machine. This percentage value is given under the assumption of a constant fundamental frequency, and a constant ampere-turns applied to each stator tooth. With the same calculation, and under the same assumption, a different percentage of 50%+/−10%, is found to optimize the torque per kg of active material.

Any appropriate material able to properly support the stator arrangement may be used for the toroidal housing. While the toroidal housing is preferably non-magnetic, there is no restriction on the conductivity of the toroidal housing material. Other factors can also influence the choice of toroidal housing material, such as a requirement of mechanical strength. In a specific embodiment, the toroidal housing is formed from aluminum.

Figure 3A:
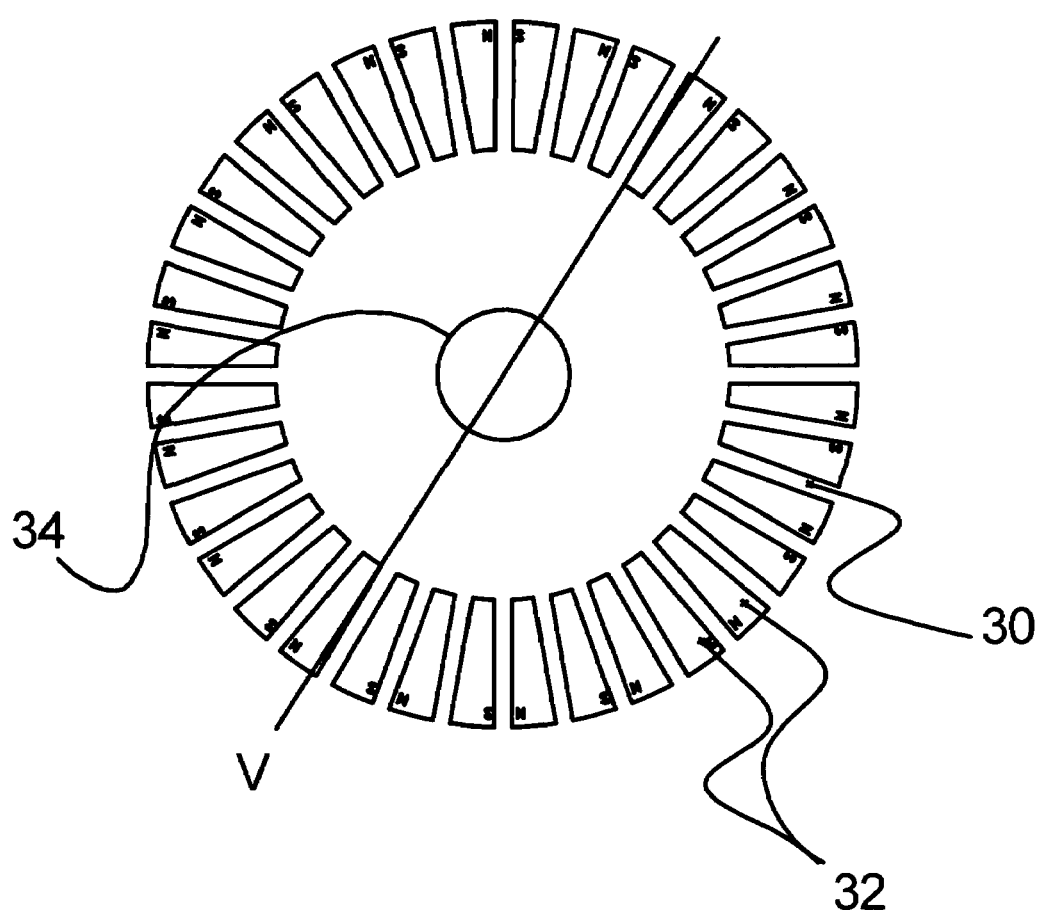
FIGS. 3A, 3B: Illustration of rotor structure, showing location and polarity of magnets.
Figure 3B:
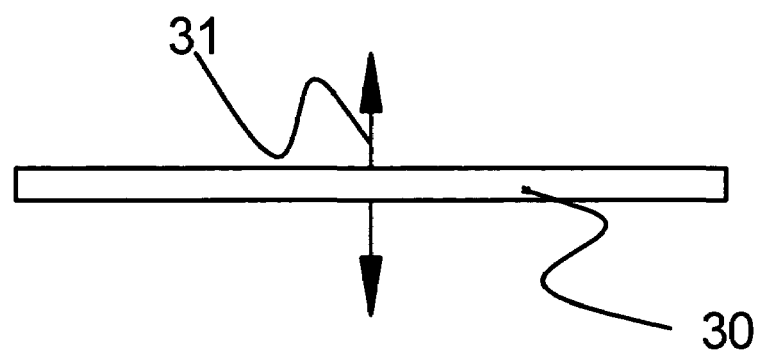

A magnetic field assembly is placed adjacent to the stator body arranged and disposed for magnetic interaction with the stator, as is common in the art. FIGS. 3A and 3B illustrate a top and side view, respectively, of a magnetic field assembly in the form of an axial type rotor 30. The rotor 30 is centered about a common axis 31 with the stator. FIG. 3A illustrates a plurality of magnets 32 possessing alternating polarity positioned about the rotor. In different embodiments, the positioning and polarity of the magnets 32 can vary, as desired for a motor design. In a preferred embodiment, the rotor comprises a plurality of permanent magnets. FIG. 3B illustrates a side view of the rotor taken along line V of FIG. 3A. In the embodiment of the rotor illustrated in FIG. 3B, the magnets 32 extend through the thickness of the rotor 30. In other embodiments, the magnets 32 do not extend through the thickness of the rotor 30. Preferably, the rotor arrangement is a disk or axial type rotor including radially spaced apart permanent super magnets (e.g., rare earth magnets, such as cobalt rare earth magnets or NdFeB), each having opposite ends defining north and south poles. The magnets 32 are supported for rotation about the axis of a shaft (not shown) along the common axis 31 or any other suitable arrangement such that the poles of the magnets are accessible along a predetermined path adjacent the stator arrangement. The magnet area of the rotor 30 has an outer diameter and an inner diameter, which forms an internal cavity 34. In preferred embodiments involving an axial-type arrangement of the rotor and stator, the outer diameter and inner diameter of the rotor 30 are substantially identical to those of the stator 20. If the outer diameter of the rotor 30 is greater than that of the stator 20, then the outer portion of the rotor does not contribute to performance, while just adding weight and inertia. If the outer diameter of the rotor is smaller than that of the stator, the result is a reduction in performance.

In the calculation of the SPP value, a pole refers to the DC magnetic field that interacts with a changing magnetic field. Therefore, in the preferred embodiment, the permanent magnets mounted on the rotor provide the DC magnetic field, and hence the number of DC poles. In other embodiments, a DC electromagnet provides the DC field. The electromagnets of the stator windings provide the changing magnetic field, i.e., one that varies with both time and position.

In different embodiments, the magnets are mounted on or set into the rotor. The magnets can be spaced such that, circumferentially, there are no clearances between alternating magnets. It is preferable that the spacing between the magnets is kept to an optimum value, which minimizes the occurrence of torque cogging. Torque cogging is the variation in torque with position after input current is greatly reduced and while the shaft is at zero or very low rpm, which causes undesirable performance and acoustic problems. An optimum spacing is derived from first dividing the low-loss metal area of the stator 20 by the number of stator slots to get the area of each single metal core tooth. The optimum spacing between the magnets will then be such that the total area of each magnet equals 175%+/−20% of the area of a core tooth.

Although the magnets have been described as permanent magnets, this is not a requirement. The magnets may be other types of magnetic materials, or, in other embodiments, may be electromagnets, induction machines, etc. Furthermore, although the device generally has been discussed in the context of a disk or axial-type embodiment, the electric device of the present invention is not limited to axial-type devices. Rather, it may take on a wide variety of configurations, such as a barrel or radial-type motor, with the rotor magnets being positioned on the outer circumference of the radial rotor. Furthermore, the number of magnets spaced across the rotor arrangement may also vary while still falling within the scope of the present invention.

Figure 4:
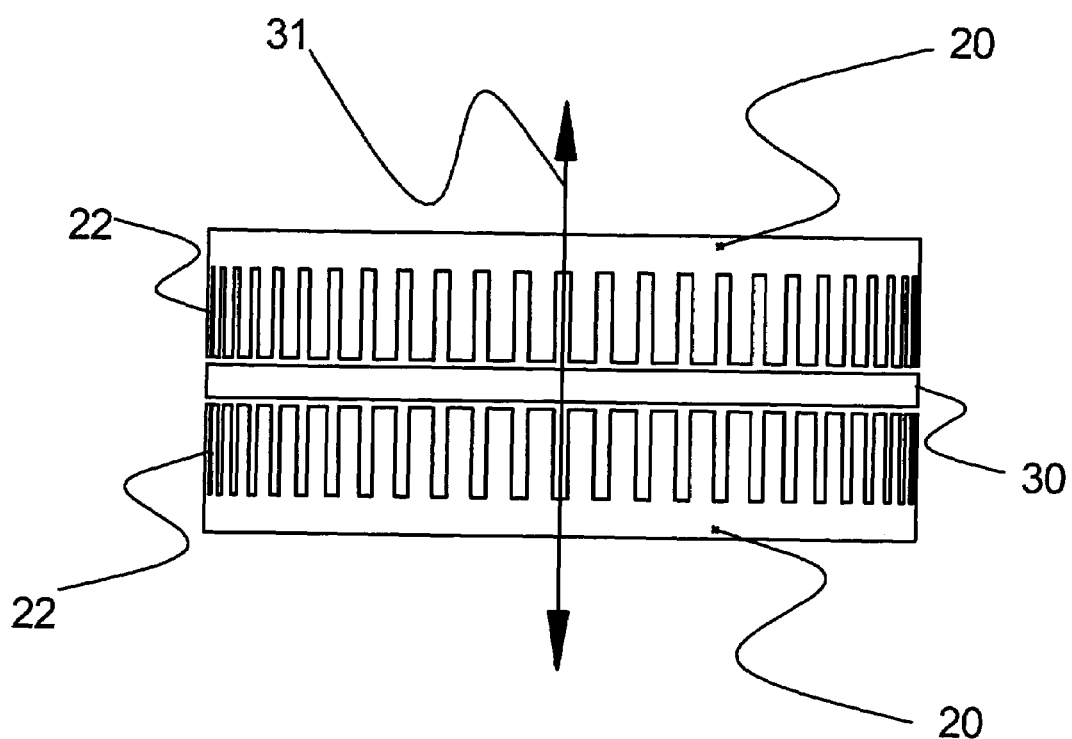
FIG. 4: Illustration of stator/rotor arrangement for axial-type motor geometry.

FIG. 4 illustrates a side view of an embodiment of the electric device which includes two stators cores 20 positioned in an axial-type arrangement on either side of, and along a common center axis 31 with a single rotor 30, which serves both stators 20. Windings 22 are wound upon the stators 20. In a specific embodiment, an electric device including stator cores comprised of Metglas® on either side of a single rotor is found to exhibit a high power density. FIGS. 6 through 29 illustrate detailed design specifications of a specific embodiment of an electric device according to the present invention. Variations of the detailed design specifications of FIGS. 6 through 29, including changes in the dimensions of individual components or even the absence of a given component, will be apparent to one of ordinary skill in the art, while still falling within the scope of the present invention.

In the above-mentioned preferred embodiment of the present invention, the stator arrangement includes two stator cores being positioned adjacent opposite sides of a rotor arrangement. However, it should be noted that the electric device of the present invention also permits stacking as many additional alternating stator and rotor arrangements as necessary to meet the requirements of the intended application. The stator housings are typically mirror images of one another, therefore only one stator core has been described in detail.

The performance characteristics of an electric device are best co-optimized, depending upon the desired performance of the machine. Example of performance characteristic include commutating at high frequencies, maintaining a low inductance, and maintaining low speed control. Power electronics are a key element for obtaining maximum performance from such an axial-type electric device. Poor power electronics could result in power electronics (PE) ripple, an undesirable variation in torque during operation of an electric device which can adversely affects the performance.

High Pole Count, High Frequency Design Using a Low Loss-Material

In a preferred embodiment, the present invention provides a motor with a high pole count that operates at high frequencies, i.e., greater than about 300 Hz. It is not known in the art for an electric device having a high pole count to also operate at a high frequency. Known devices using conventional Si—Fe cannot be switched at magnetic frequencies significantly above 300 Hz due to core losses resulting from a changing magnetic field, where the core losses cause the material to heat to the point where the device cannot be cooled by any acceptable means. Under certain conditions, the heating of the conventional Si—Fe material may even be severe enough that the machine cannot be cooled whatsoever, and will self-destruct. However, it has been determined that the low-loss characteristics of advanced low loss materials, including amorphous metals, nanocrystalline metals, optimized Si—Fe alloys, grain-oriented Fe-based materials or non-grain-oriented Fe-based materials allow much higher switching rates than conventional Si—Fe materials. While, in one embodiment, the use of Metglas® for the stator core removes the system limitations due to heating at high frequency operation, the rotor design can also be also improved to exploit the properties of the low-loss material.

A high pole count is a relative term for a given device. The number of poles in the devices of the present invention is a variable based on the machine size (a physical constraint) and on the expected performance range. The number of poles can increase until magnetic flux leakage increases to an undesirable value, or fewer poles result in improved performance. There is also a mechanical limit presented by the stator on the number of rotor poles, since stator slots must coincide with the rotor magnets. There is also a mechanical and electromagnetic limit in concert on the number of slots that can be made in the stator, which in turn is a function of the frame size of the machine. Some boundaries can be set to determine the upper limits of slots for a given stator frame with proper balance of copper and Metglas®, which can be used as a parameter in making good performing axial gap machines. The present invention provides motors with about 4 or 5 times greater numbers of poles than industry values for most conventional electric machines.

As an example, for an industry typical motor having 6 to 8 poles, for motors at speeds of about 800 to 3600 rpm, the commutating frequency is about 100 to 400 Hz. The commutating frequency (CF) is the rotating speed multiplied by the number pole pairs, where the pole pairs is the number of poles divided by two, and the rotating speed is in units of the number of revolutions per second (CF=rpm/60×pole/2). Also available in industry are high pole count of greater than about 16 poles, but speeds of less than 1000 rpm, which still corresponds to a frequency less than 300 Hz. Alternatively, motors are also available with a relatively low pole count (of less than about 6 poles), and with speeds up to 3000 rpm, which still have a commutating frequency less than about 400 Hz. In different embodiments, the present invention provides machines that are, for example, 96 poles, 1250 rpm, at 1000 Hz; 54 poles, 3600 rpm, at 1080 Hz; 4 poles, 30000 rpm, at 1000 Hz; and 2 poles, 60000 rpm, at 1000 Hz. The motors of the invention therefore provide factors of 4 or 5 higher frequencies when compared to "standard" motors. The motors of the invention are more efficient than typical motors in the industry when operated in the same speed range, and as a result provide greater speed options.

Preferred Design Method

Figure 12:
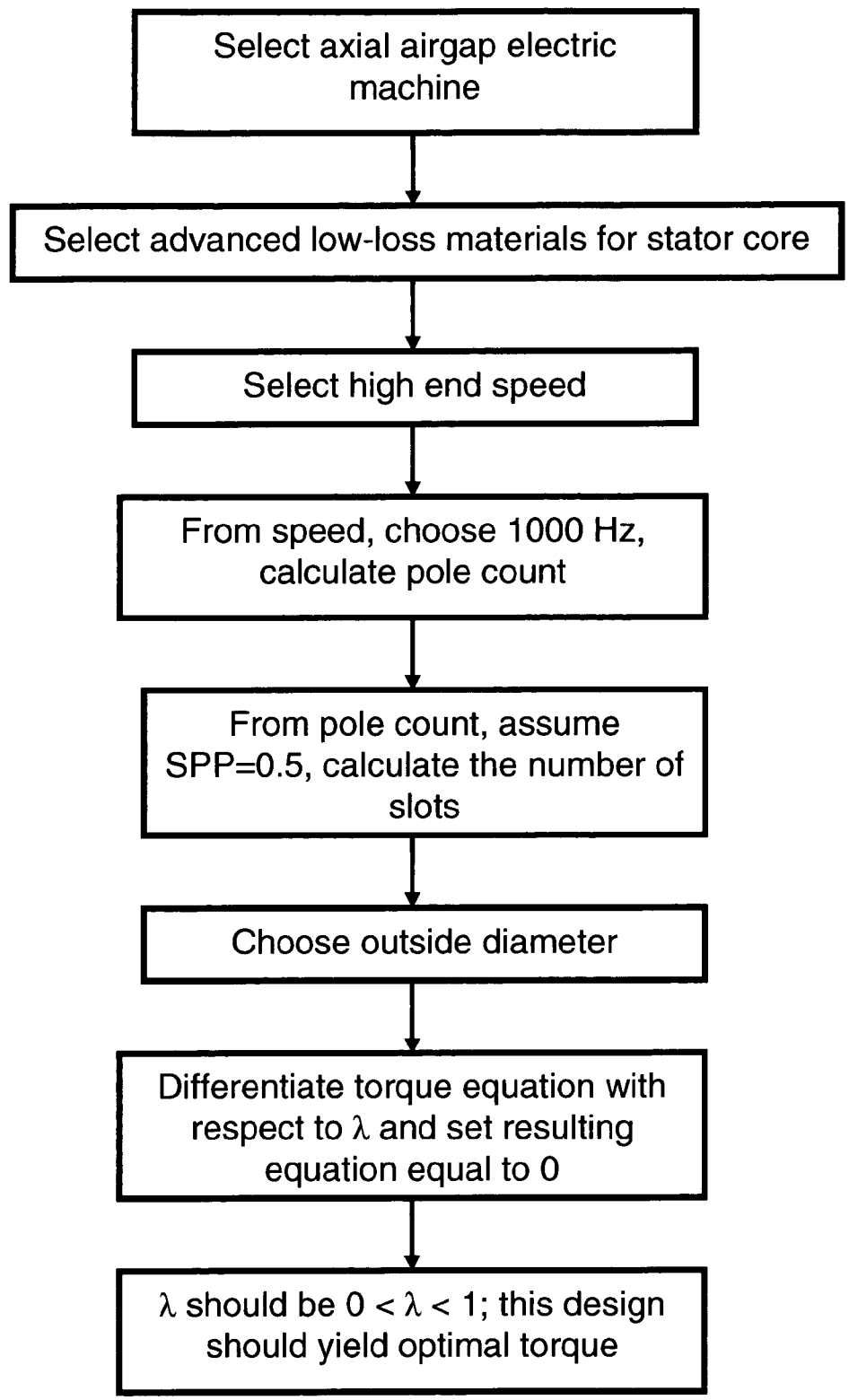
FIG. 12: Flowchart of method of designing efficient high speed axial air-gap electric device using low-loss materials.
Figure 13:
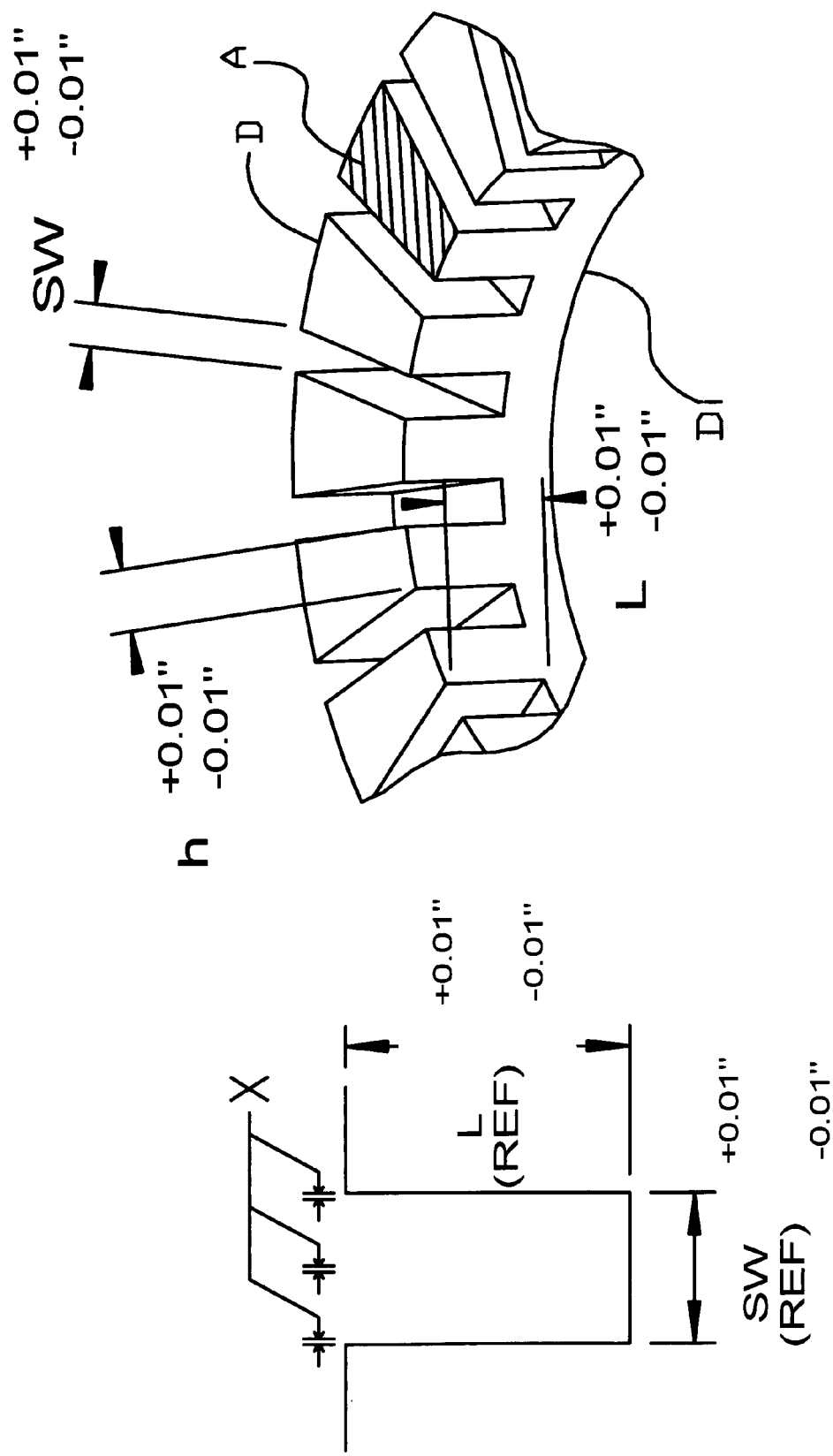
FIG. 13: Illustration of various dimensions taken from magnetic core for use in the design method of FIG. 12.
Figure 14:
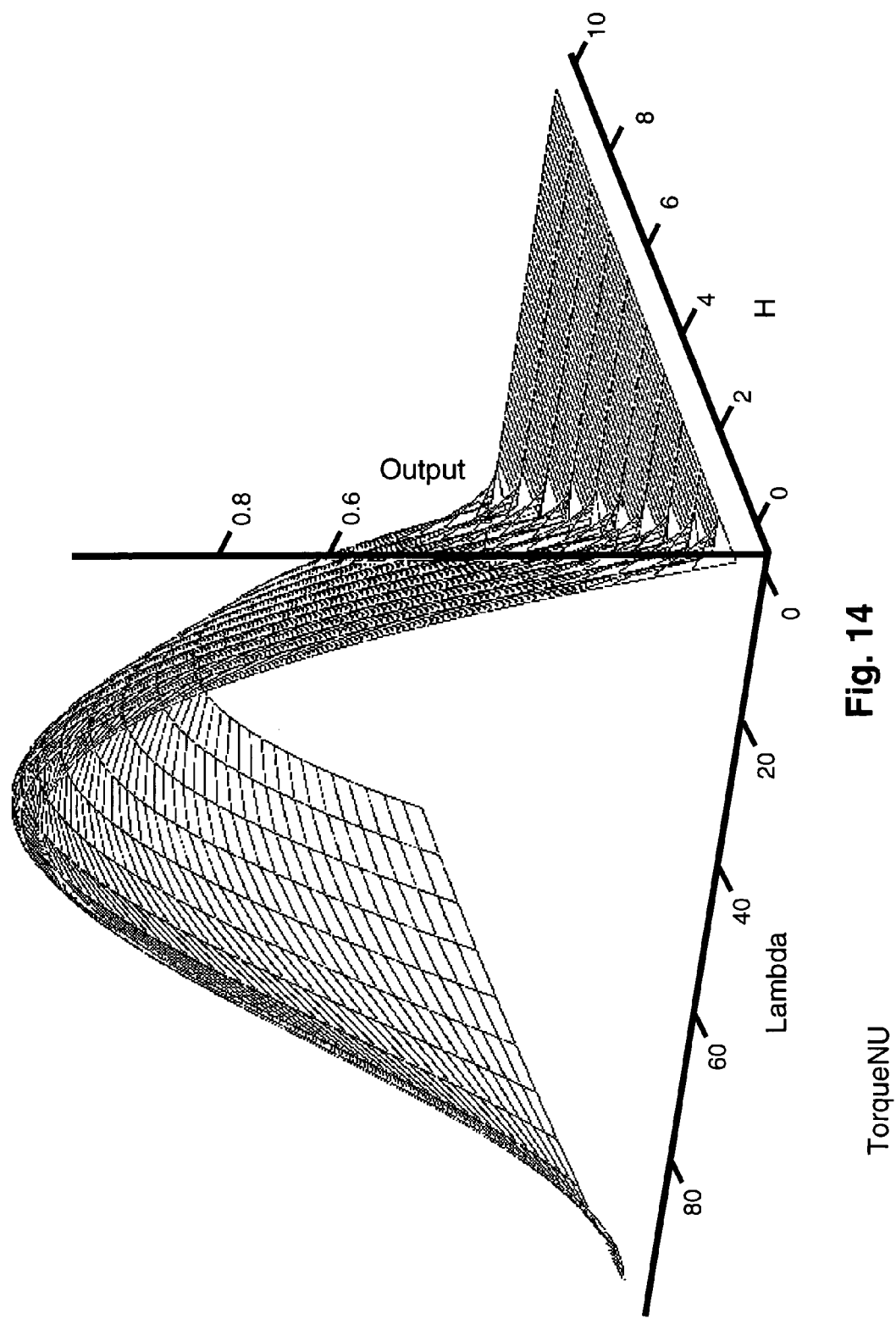
FIG. 14: Example surface plot of torque equation.

A method for determining the design characteristics for various preferred embodiments of the present invention is set forth in FIG. 12. The design method set forth in FIG. 12 is based upon a recognition that, through a combination of equation manipulation, an axial air-gap machine can be defined with relatively few variables. By defining the machine with as few variables as possible, certain variables can be maximized, and the electric machine can be optimized at a given speed. The method of FIG. 12 shows a method for designing an axial air-gap machine with optimized torque at a given speed, and therefore, optimized power. In order to design such a machine, the machine must first be reduced to a single equation that expresses the torque of the machine with as few variables as possible. In the present method, it has been determined that the torque of an axial air-gap machine can be expressed according to the following equation:

$$\tau = \frac{1}{24} \cdot j \cdot 2^{\frac{1}{2}} \cdot (-\lambda \cdot D \cdot \pi + h \cdot t + x \cdot t) \cdot L \cdot pf \cdot D \cdot (-D \cdot \pi - D \cdot \pi \cdot \lambda^2 + 2 \cdot \lambda \cdot D \cdot \pi - 2 \cdot h \cdot t + 2 \cdot h \cdot t \cdot \lambda) \cdot E$$

where, $\tau$=the output torque of the electric machine in N·m:

j=the current density in A/mm$^2$;

D=the outer diameter of the stator in mm;

h=the corepoint tooth width at the inner diameter in mm;

t=the total slots per stator;

x=total wasted slotwidth from insulation in the stator in mm;

pf=the packing factor as a percent slot fill;

L=the axial length of the coil in mm;

B=peak flux density in Tesla;

Several of the above variables are also referenced in graphic form in FIG. 13.

As seen from the above equation, there are 9 variables. However, when approaching any instance of a design, many of these variables will be fixed numbers that are not subject to change. For example, in the above equation, assume that based upon the type of machine being designed, j, x, pf, L and B are not truly subject to change. This leaves $\lambda$, D, h and t as the only variables to be manipulated. As discussed below, the designer then selects a D and t value, depending upon design flexibility. This leaves an equation for torque with respect to h and $\lambda$. The graph of such an equation will result in a surface plot such as that shown in FIG. 14. If the designer then differentiates the torque equation with respect to $\lambda$, he or she can set the resulting equation equal to zero and solve for $\lambda$. The solution that yields $\lambda$ between zero and 1 will provide an optimal torque for all of the given inputs (since, by definition, $\lambda$ can only exist between 0 and 1).

The above design method is summarized as shown in FIG. 12. As shown in FIG. 12, the designer of the machine assumes an axial air-gap machine with a stator comprised of advanced low-loss materials. The designer then selects a desired high end speed. Next, approximately 1000 Hz is chosen as a desirable synchronous frequency of the machine and the pole count is calculated according to the equation f=S·P/2, where S is the desired high end operating speed and P is the number of poles. Then, using the calculated pole count and assuming the slots per phase per pole of the machine to be 0.5, as discussed below as a preferred embodiment, the number of stator slots can be calculated. Depending upon the desired application and limitations, the outer diameter of the machine is chosen. This leaves only h and $\lambda$ for determination according to the torque equation provided above. The torque equation is then differentiated with respect to $\lambda$, and the resulting equation is set equal to zero. That equation is then solved for $\lambda$. The solution that yields $\lambda$ between zero and 1 will provide an optimal torque for all of the given inputs.

As described above, the above design method provides a preferred embodiment of an efficient and high powered high speed electric device using advanced low-loss materials. Of course, other embodiments and designs outside of the preferred embodiments are contemplated without departing by the spirit and scope of the present invention.

Slots Per Phase Per Pole Ratio

In a preferred embodiment, the invention provides a motor where the SPP ratio is optimally equal to 0.5. In a preferred embodiment, the present invention provides a three-phase motor. For the three-phase motor, the number of rotor poles is ⅔ number of stator slots, with the number of slots being a multiple of the number of phases. While the three-phase (wye configuration) is an industry convention, the invention does not exclude the employment of a delta-configuration.

On the one side, as the SPP ratio starts at a very high number, for example about 6, and decreases towards 0.5, electric devices demonstrate substantial torque cogging, power electronics ("PE") ripple, and high noise levels. As previously described, both cogging and PE ripple produce variations in torque that have an undesirable effect on the performance of the electric device.

Conventionally, the focus has been to manufacture devices with an increased number of magnetic core slots and a decreased number of rotor poles, which achieves SPP ratios of 1.0 to 3.0, and provides more functional, less noisy electric devices. However, while electric machines operating at SPP ratios greater than 1.0 provide smoother output due to better winding distribution, they suffer from increased end turns. End turns are the portions of the wire in the stator that do not contribute to the torque and power output of the machine. In this sense they are undesirable, in that they are costly and contribute ohmic losses to the machine while providing no benefit. Hence, one goal of the motor designer is to minimize end turns and provide a motor with manageable noise and cogging.

Optimally, one would like to operate at a SPP ratio of about 0.5, as this results in an electric device having minimum end turns. Typically, the end turns are shorter resulting in more efficient copper, but torque can be improved while torque perturbations (cogging) are greater. Embodiments of the present invention with an axial arrangement do not benefit from an SPP ratio greater than 1.0, and have SPP at 0.5 for better performance. Furthermore, with the relatively high pole counts of the electric machines provided herein, and with a SPP ratio at 0.5 or less, the magnets of the rotor (and the rotor structure in general) can be made thinner and less expensively.

It is possible to wire multiple slots into a common magnetic section—that is defined by SPP greater than 0.5. This is the result of there being a greater number of stator slots than rotor poles, resulting in a distributed winding. A value of SPP less than or equal to 0.5 indicates that there are no distributed windings. A convention in the industry is to include distributed windings in the stator. However, distributed windings will raise the value of SPP, and reduce the frequency. As a result, in conventional machines with SPP=0.5, and low frequency, there will also be a low pole count. A low pole count with SPP=0.5 results in high, difficult to control cogging.

It is advantageous to build a motor with a fractional number of SPP, since such a motor may employ preformed coils around a single stator tooth. In different embodiments, the SPP ratio is 0.25, 0.5, 0.75, 1.0 or greater than 1.0. In a preferred embodiment, the SPP ratio is 0.5.

Flexibility in Wiring/Winding Design

A further advantage of the device of the present invention is that it permits the manufacturer to utilize different wiring configurations. Traditional stator designs limit winding design choices because of the above-mentioned focus on using SPP ratios of 1.0 to 3.0, which require distributing the windings over multiple slots. It becomes difficult to have more than two or three winding options with distributed windings. The present invention provides the ability to take advantage of the SPP=0.5 design, where there is typically only one discrete coil per stator tooth. However, the invention does not exclude other arrangements with SPP=0.5. The single tooth coil can be easily modified and re-connected to provide any voltage demanded by a given application. Thus a single set of motor hardware can provide a broad range of solutions simply by changing the coil. Generally, the coil is the easiest component in an electromagnet circuit to modify.

Thus, given an SPP ratio approaching 0.5 as in the device of this invention, there is significant flexibility as to stator winding configurations. For example, the manufacturer may wind each stator separately from one another, or the manufacturer may provide separate stator windings within the same stator. This capability is one of the advantages of a system with a SPP equal to 0.5. Although there have occasionally been industry systems that employs SPP=0.5, they are not widespread and have met with success only in niche applications. The present invention successfully provides a system with SPP equal to 0.5 that allows for this flexibility in winding.

Thermal Properties

One of the characteristics that limits device output in all electric devices, including both those using conventional Si—Fe alloys and those using amorphous metals, nanocrystalline metals, optimized Si—Fe alloys, grain-oriented Fe-based materials or non-grain-oriented Fe-based materials, is waste heat. This waste heat comes from a number of sources, including, but not limited to, ohmic losses, skin and proximity effect losses, rotor losses from eddy currents in magnets and other rotor components, and core loss from the stator core. Because of the large amounts of waste heat generated, conventional machines soon reach the limit of their ability to discard the waste heat. The "continuous power limit" of conventional machines is often determined by the maximum speed at which the machine can operate continuously while still dissipating all of the waste heat that is generated. The continuous power limit is also a function of the current.

In the device of the present invention, however, less waste heat is generated because amorphous metals, nanocrystalline metals, optimized Si—Fe alloys, grain-oriented Fe-based materials or non-grain-oriented Fe-based materials have lower losses than conventional Si—Fe, and the designer can exploit these low loss characteristics by increasing frequency, speed and power, and then correctly balancing and "trading" the lowered core loss versus the possibility of increased ohmic loss.

Overall, for the same power as conventional machines, the motor of the present invention exhibits lower loss, and hence higher torques and speeds, as illustrated in FIG. 5, and discussed in greater detail below.

Accordingly, the device of the present invention can achieve higher continuous speed limits than conventional machines.

Improved Efficiency

One advantage of the present invention is its ability to maximize the device's efficiency while maintaining cost effectiveness. The efficiency is defined as the power output of the device divided by the power input. The ability of the present invention to operate simultaneously at higher commutating frequencies with the high pole count results in a more efficient device having low core losses and high power density. The high frequency limit of 400 Hz is an industry standard beyond which there are few, if any practical applications.

The performance and increased efficiency of the present invention is not simply an inherent feature of replacing conventional Si—Fe with a low-loss material such as amorphous metal. From a historical perspective, this was tried nearly 15 years ago, and met with performance failure (including overheating and lower power). This failure was a result of merely applying a new material (amorphous) in a manner that was designed for and suitable to a conventional material (e.g., Si—Fe have 3.5 wt. % or less of Si). This early performance failure, combined with the perceived cost of the amorphous metal processing into motors, caused nearly all companies in the industry to abandon the research. The present invention has also overcome the performance failures by designing a rotating machines that exploit the properties of the amorphous metals, nanocrystalline metals, optimized Si—Fe alloys, grain-oriented Fe-based materials or non-grain-oriented Fe-based materials. This results in a motor that possesses all of the advantageous qualities of operating at commutating frequencies greater than 400 Hz, with a high pole count, at high efficiency and with a high power density. While other conventional methods have been able to provide motors with only a combination of two of the four qualities, the present invention provides motors that exhibit all four qualities simultaneously.

Another advantage of the present invention is that efficiency losses, including hysteresis losses, are significantly reduced. Hysteresis losses result from impeded domain-wall motion during magnetization for the grain-oriented Si—Fe alloys, which can contribute to the overheating of the core. As a result of the increased efficiency, the motor of the present invention is capable of achieving a greater continuous speed range. The speed range issue is described as area under the torque-speed curve. Conventional motors are limited in that they can either provide low torque for high-speed ranges (low power), or high torque for low-speed ranges. The present invention successfully provides motors with high torque for high-speed ranges.

TABLE 2

COMPARISON OF DESIGN PARAMETERS AND PERFORMANCE

|  | Cylindrical with core[1] | Ironless disk type[2] | Motor 70-32[3] | Exemplary Inventive machine[4] |
|---|---|---|---|---|
| Power, kW | 10 | 10 | 10 | 12.4 |
| Speed, rpm | 750 | 750 | 750 | 750 |
| Torque, Nm | 133 | 131 | 131 | 158 |
| Efficiency | 91.4% | 92.5% | 92.3% | 92.1% |
| Current Density ($Jr_{rms}$), A/mm$^2$ | 4.2 | 4.2 | 9 | 10 |
| Permanent magnet mass, kg | 1.57 | 12.4 | 2 | 1.9 |
| Active Material Mass, kg | 41 | 22.5 | 23 | 13.8 |
| W/kg active material | 244 | 444 | 435 | 899 |
| Cost, all material, no labor | $588 | $1,232 | $440 | $224 |
| Frequency |  | 100 | 225 | 400 |
| Winding Outer Diameter (OD), mm |  | 360 | 300 | 360 |
| Equal Thermal ratings | natural cooling |  | 1 W/in$^2$ |  |

[1] Conventional iron core motor (data provided by Gieras et al.)
[2] Ironless disk type design of Gieras et at.
[3] 70-32, derated to 750 rpm, without redesigning according to the invention
[4] Exemplary Motor as disclosed herein, redesigned with same outer diameter as Gieras Table 2 provides a comparison of the design parameters and performance of the motor of the present invention with those of a 10 kW, 750 rpm ironless disk type permanent magnet brushless motor, as published in (Jul. 2, 2002) Gieras et al., IEEE, and an equivalent 10 kW, 750 rpm with conventional stator and rotor cores. As shown in Table 2, an exemplary motor designed according to the principles disclosed herein provides equal or greater power, the same speed, equal or greater torque, approximately the same efficiency, and greater current density (as a result of the lower core losses). The motor of the invention also uses less permanent magnet material and, in fact, less active material overall than the Gieras et al. motor or a conventional motor. Table 2 also shows that the invention provides equal or better torque per kilogram of active material than the Gieras et al. system, is less expensive, and operates at much higher frequency (by a factor of 2), with a similar thermal rating. This is accomplished through exploiting the advantageous properties of the amorphous metal for this embodiment.

TABLE 3

COMPARISON OF DESIGN PARAMETERS AND PERFORMANCE

|  | IM[a] | IPM[c] (NdFeB) | AFTPM[d] (Ferrite) | RTFTPM[e] (Ferrite) | Motor I[f] | Motor II[g] |
|---|---|---|---|---|---|---|
| Power (HP) | 3 | 4.96 | 1.18 | 2.98 | | |
| Kw | 2.2 | 3.7 | 0.9 | 2.2 | 2.6 | 6.8 |
| Torque (Nm) | 12.18 | 20.2 | 3 | 11.78 | 14 | 36 |
| Speed | 1755 | 1750 | 2800 | 1800 | 1800 | 1800 |
| Volume (cm$^3$) | 8092[b] | 10391 | 1272 | 2730 | 6919 | 8042 |
| Weight (kg) | 35.4 | 48 | 5.5 | 11.76 | 5.2 | 12.8 |
| Torque/mass (Nm/kg) | 0.34 | 0.42 | 0.55 | 1.00 | 2.69 | 2.81 |
| Torque/volume (Nm/cm$^3$) | 0.0015 | 0.0019 | 0.0024 | 0.0043 | 0.0020 | 0.0045 |
| Efficiency | 82.5% | 88.0% | 83.0% | 87.1% | 87.9% | 92.1% |

[a]GE Motor with model # 5K182BC218A, data provided by Qu et al.
[b]Excluding room for the fan and heat sink.
[c]Yasakawa Electric Co. motor, data provided by Qu et al.
[d]Designed by Federico Caricchi, data provided by Qu et al.
[e]Radial-flux, toroidally-wound, permanent magnet machine designed by Qu et al.
[f]Torque per mass
[g]Torque per volume Table 3 provides a comparison of the design parameters and performance of motors of the present invention with those of a dual-rotor, radial-flux, toroidally-wound, permanent magnet machine (RFTPM) as published in (Jul. 2, 2002) Qu et al., IEEE, and also a commercial Induction Motor (IM), and Interior Permanent Magnet machine (IPM), and an Axial-Flux Toroidally-Wound Permanent Magnet machine (AFTPM). Both Motor I and Motor II operate at a frequency of 1000 Hz, have an outer diameter of approximately 13 cm, with similar thermal ratings (1.0–1.45 W/in$^2$). Table 3 shows that the motors of the invention provide greater torque for a given speed and at a higher efficiency.

Idealized Square Torque-Speed Curve

Figure 5A:
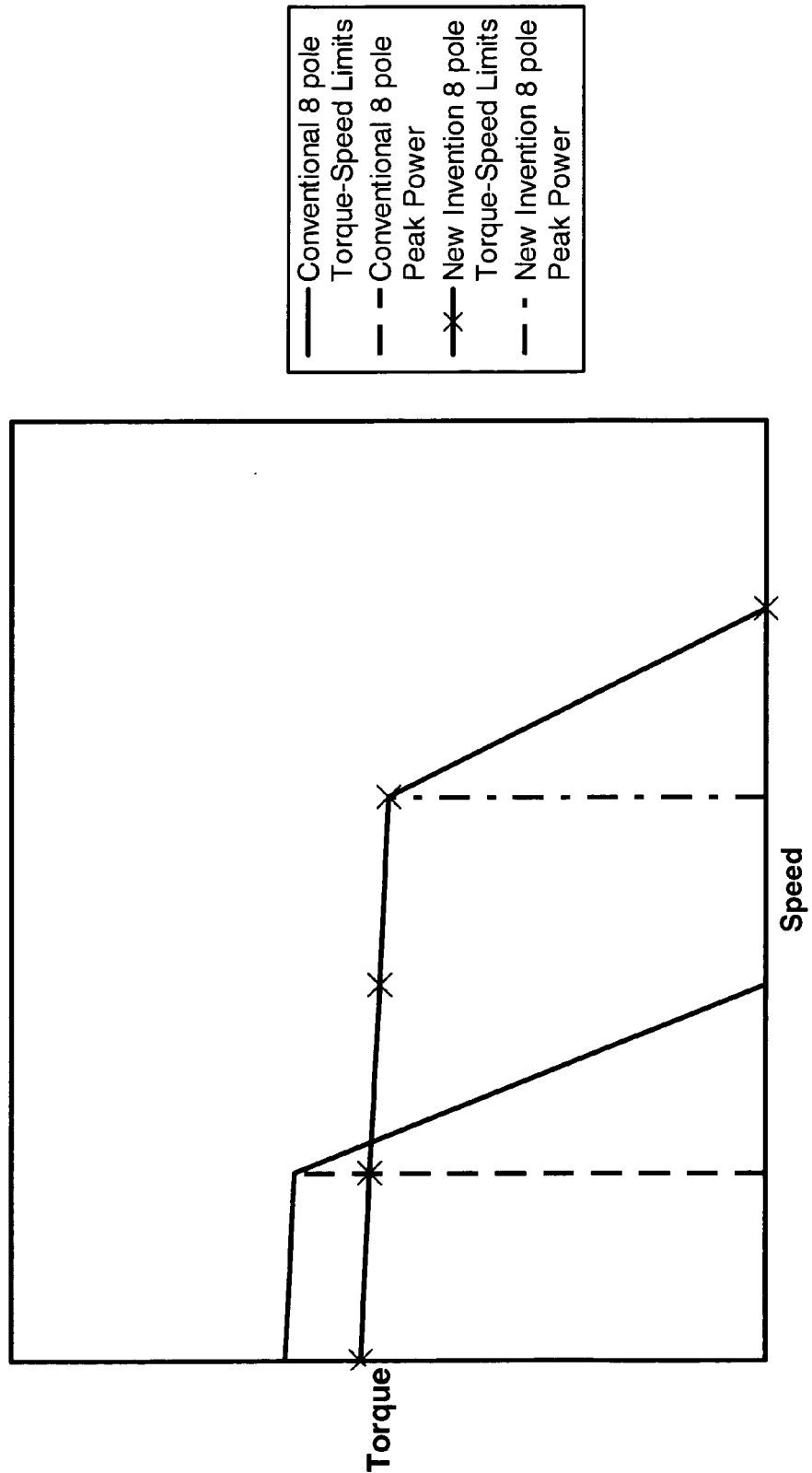
FIGS. 5A, 5B: Torque vs. speed curve, comparing the performance of a conventional motor to a motor of the invention.

The present invention provides an electric device that operates with a more square torque-speed curve. FIG. 5a shows case 1: the torque-speed curves of a motor designed according to the invention and a conventional motor, where speed is plotted on the horizontal axis, and torque on the vertical axis. The pole count chosen was 8, although any pole count could be chosen as means of comparison. It is desirable in a motor that any torque could be achieved for any speed, which is portrayed as a rectangular or square area in which the motor operates.

Conventional machines can make a square torque speed curve for only a percentage of a given space available, as the torque (vertical axis) is limited by thermal losses contributed by the ohmic losses. Additionally, the speed (horizontal axis) is limited by the increasing frequency, which also causes increasing core losses in the material, as discussed previously. That is, if one analyzes a traditional torque to speed curve for conventional motors, one gets a curve similar to that shown in FIG. 5a. By contrast, while the motors of the present invention present similar torque, the speed range is greatly increased over conventional motors due to much the lower frequency-related losses.

Figure 5B:
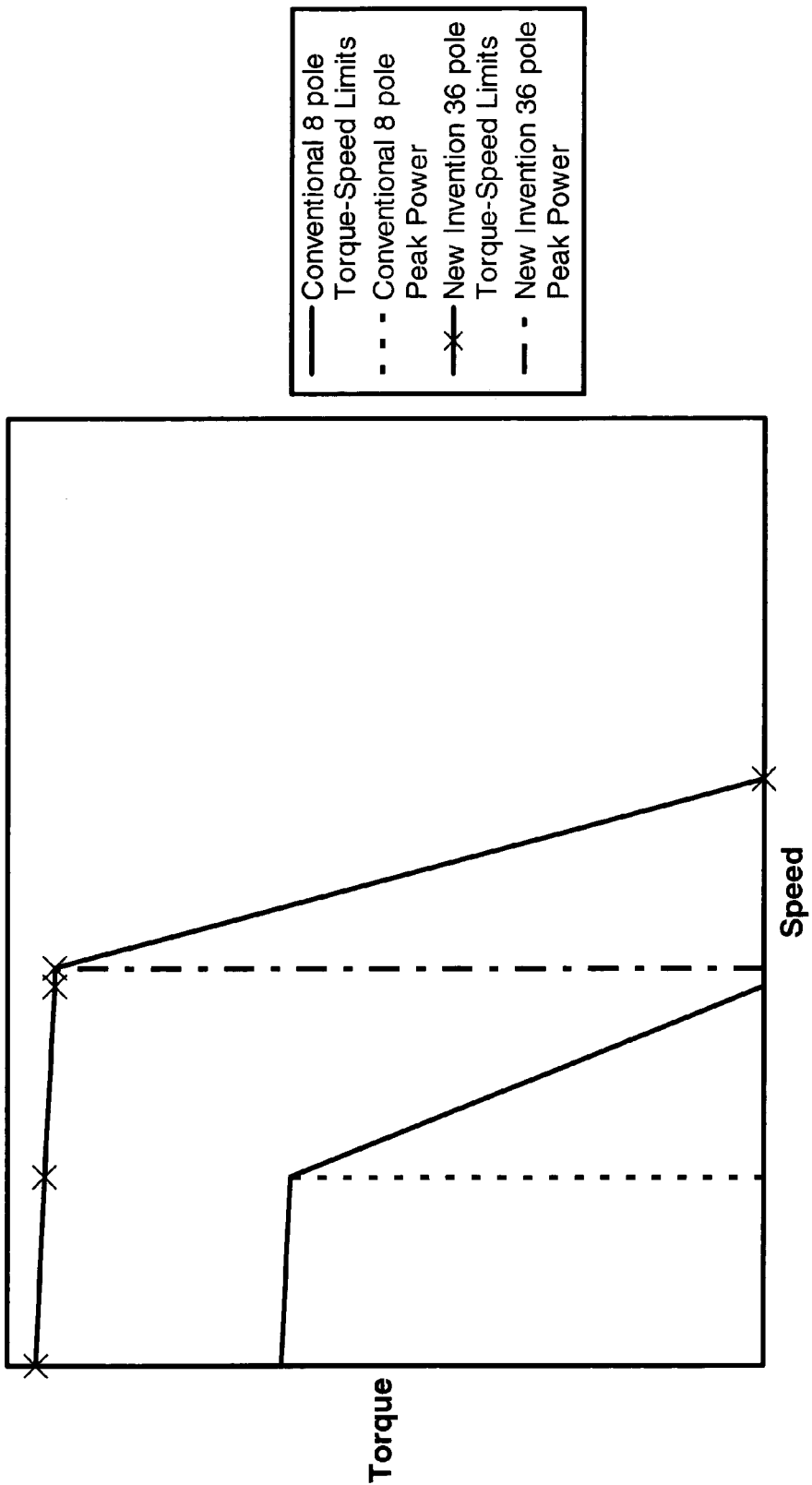
Figure 6:
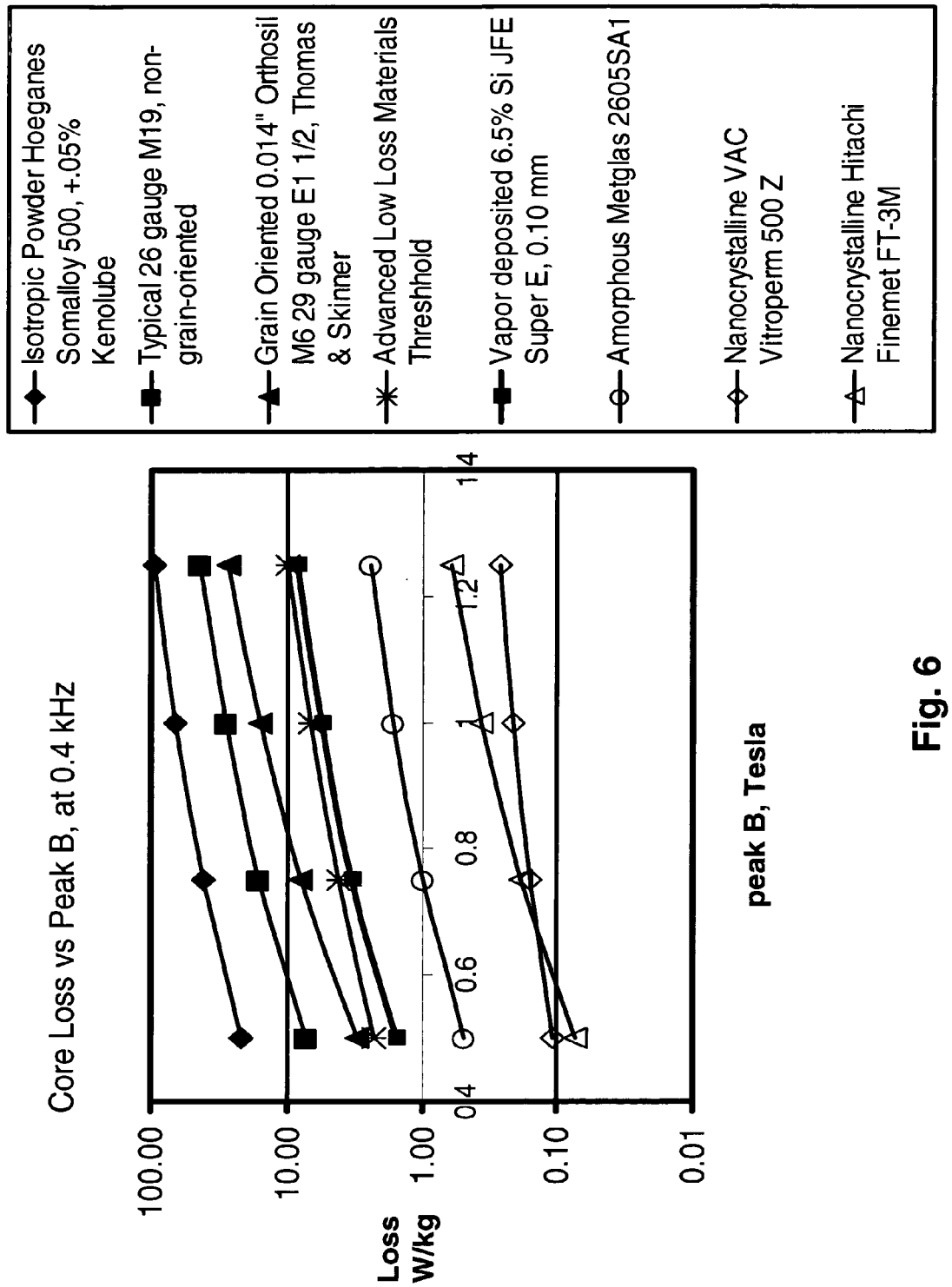
FIG. 6: Chart of core loss of various soft magnetic materials versus the magnetic flux density, at 0.4 kHz.
Figure 7:
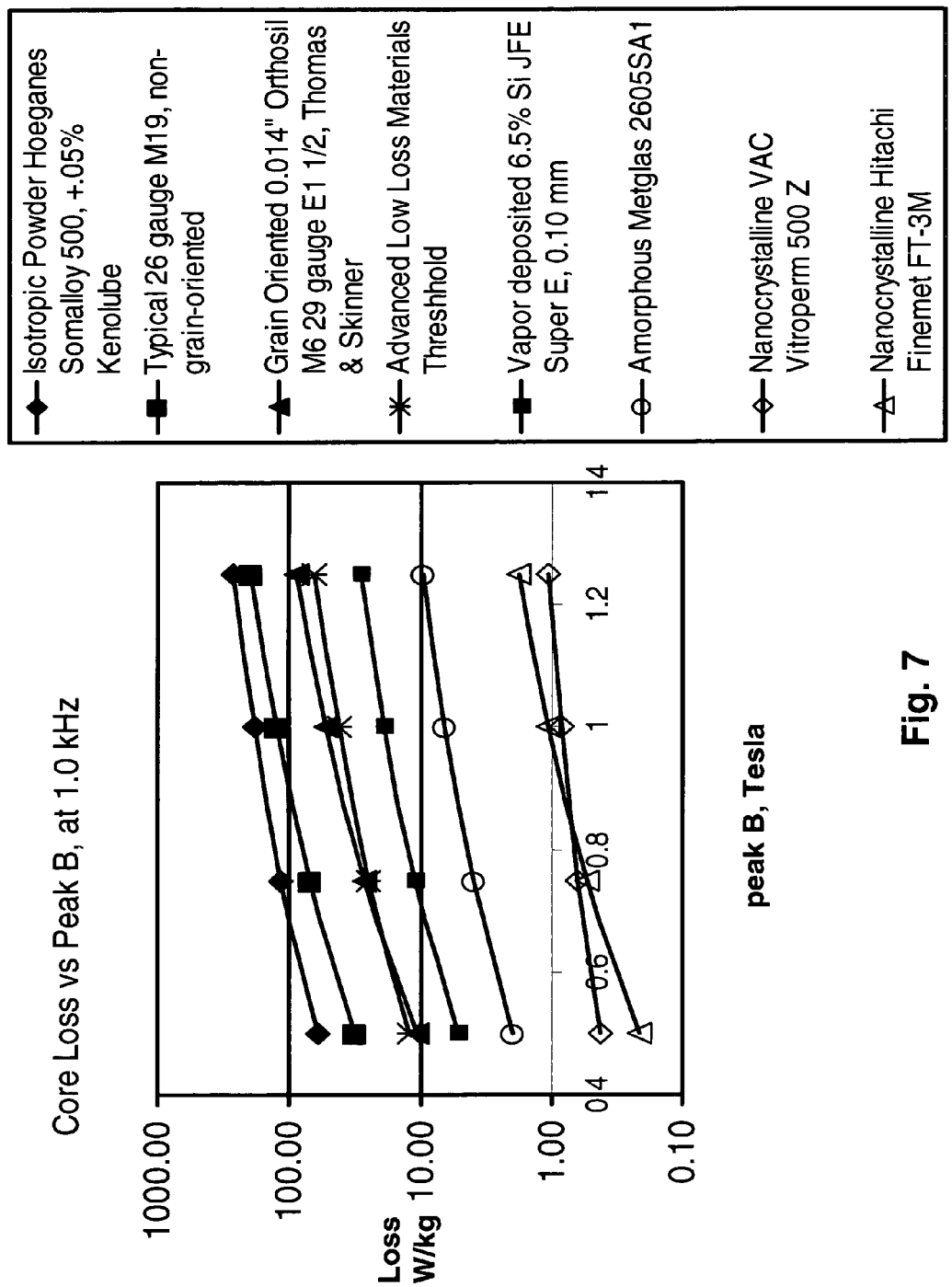
FIG. 7: Chart of core loss of various soft magnetic materials versus the magnetic flux density, at 1.0 kHz.
Figure 8:
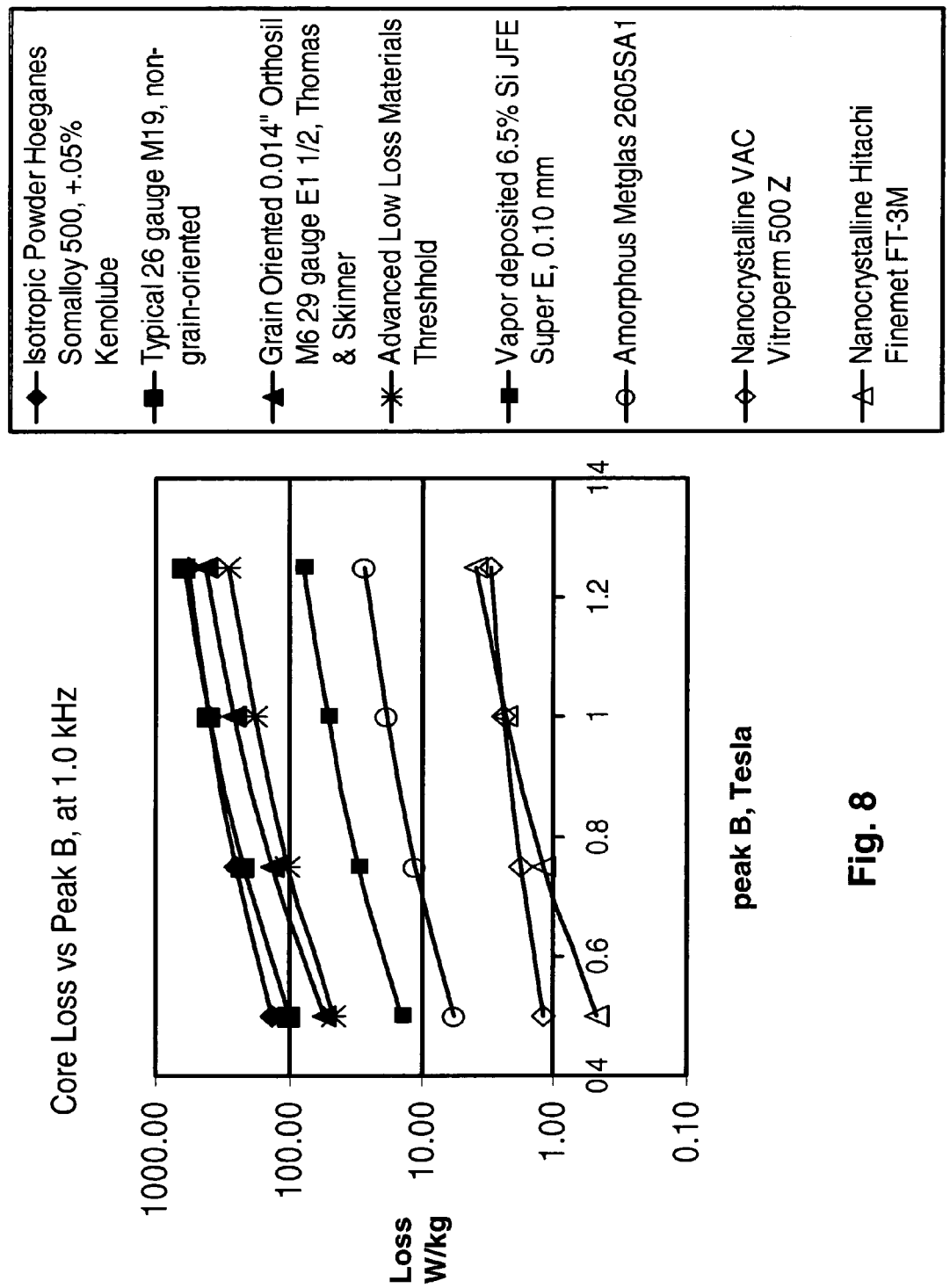
FIG. 8: Chart of core loss of various soft magnetic materials versus the magnetic flux density, at 2.0 kHz.
Figure 9:
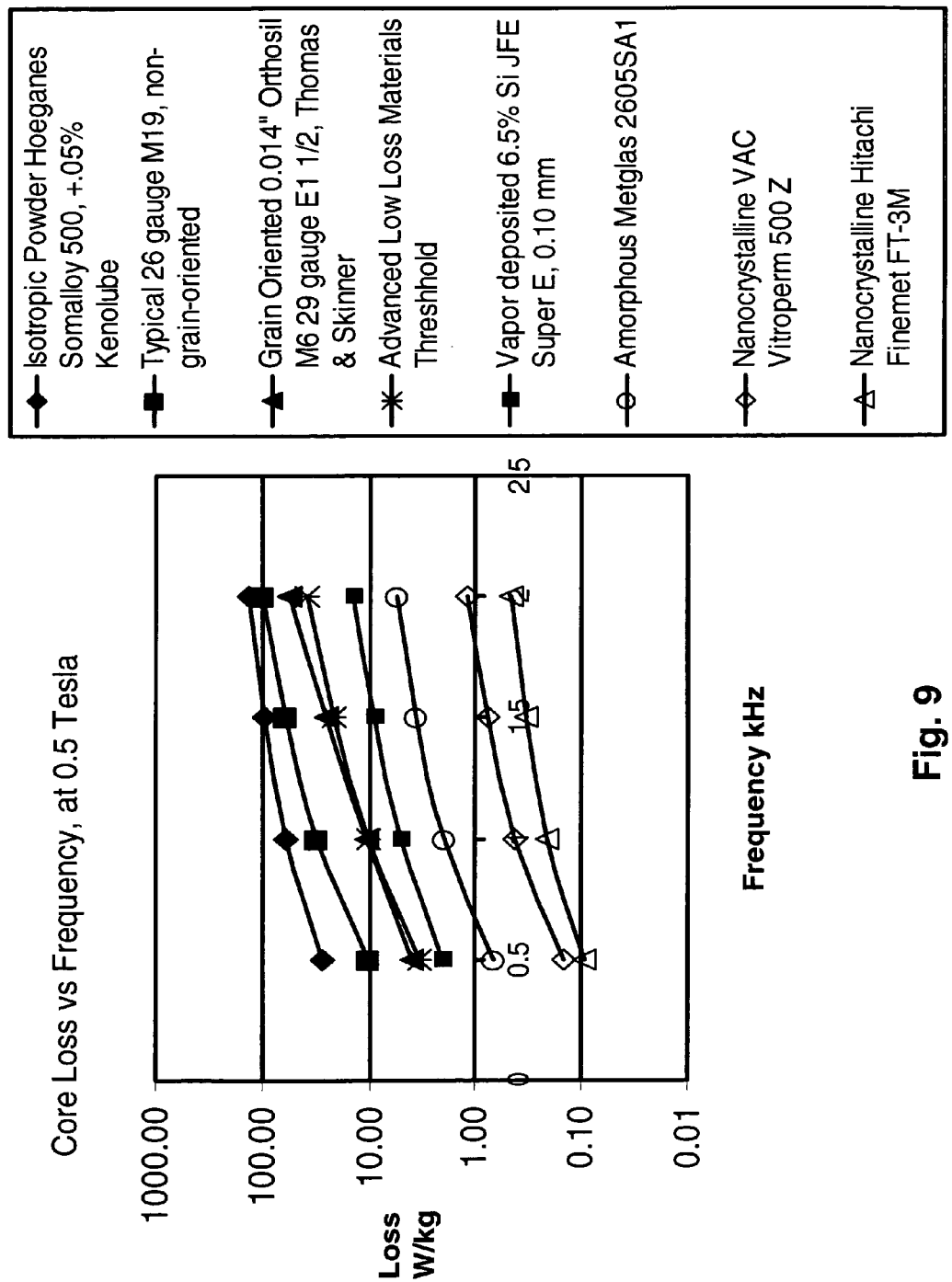
FIG. 9: Chart of core loss of various soft magnetic materials versus frequency, at 0.5 tesla.
Figure 10:
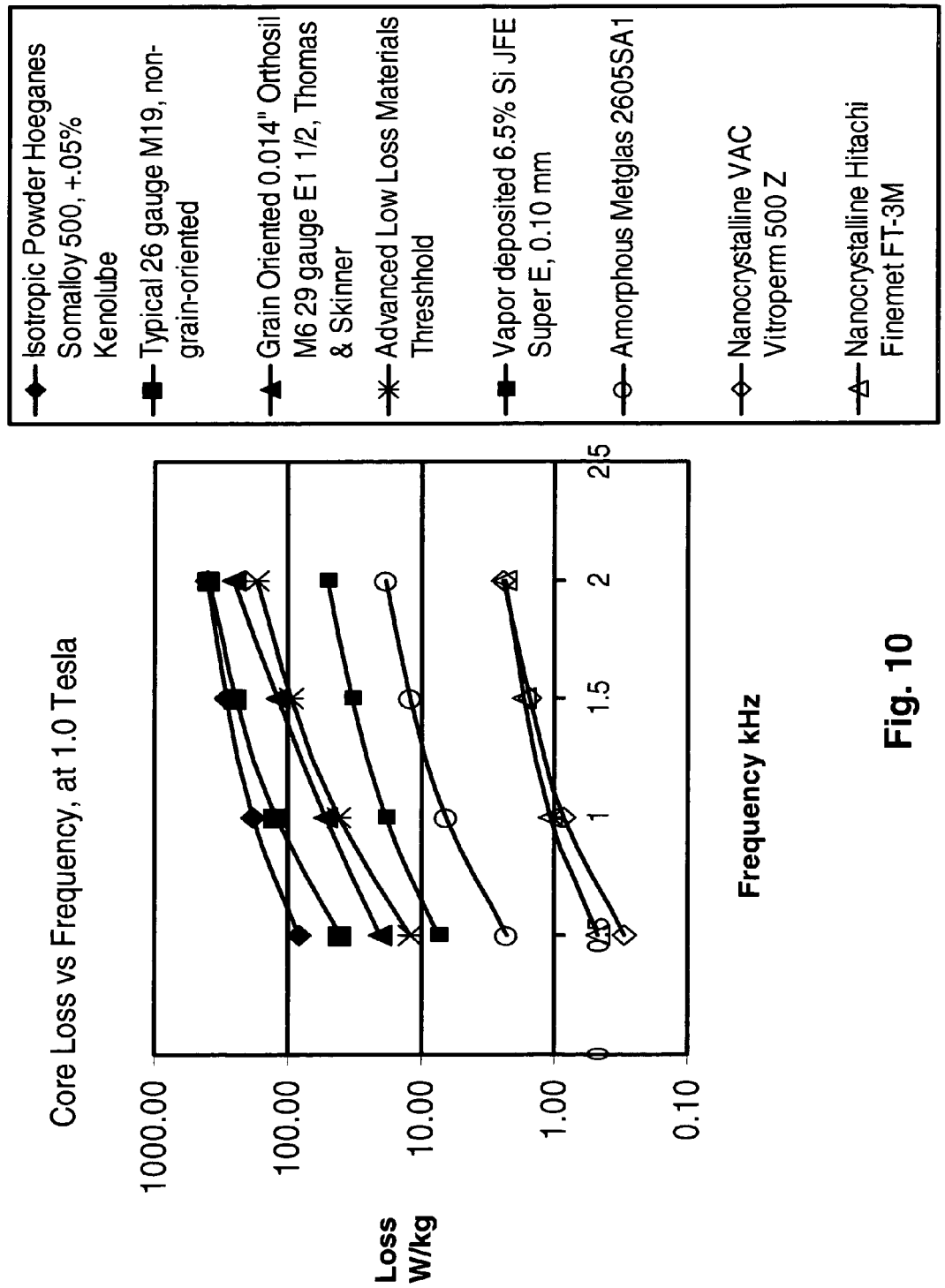
FIG. 10: Chart of core loss of various soft magnetic materials versus frequency, at 1.0 tesla.
Figure 11:
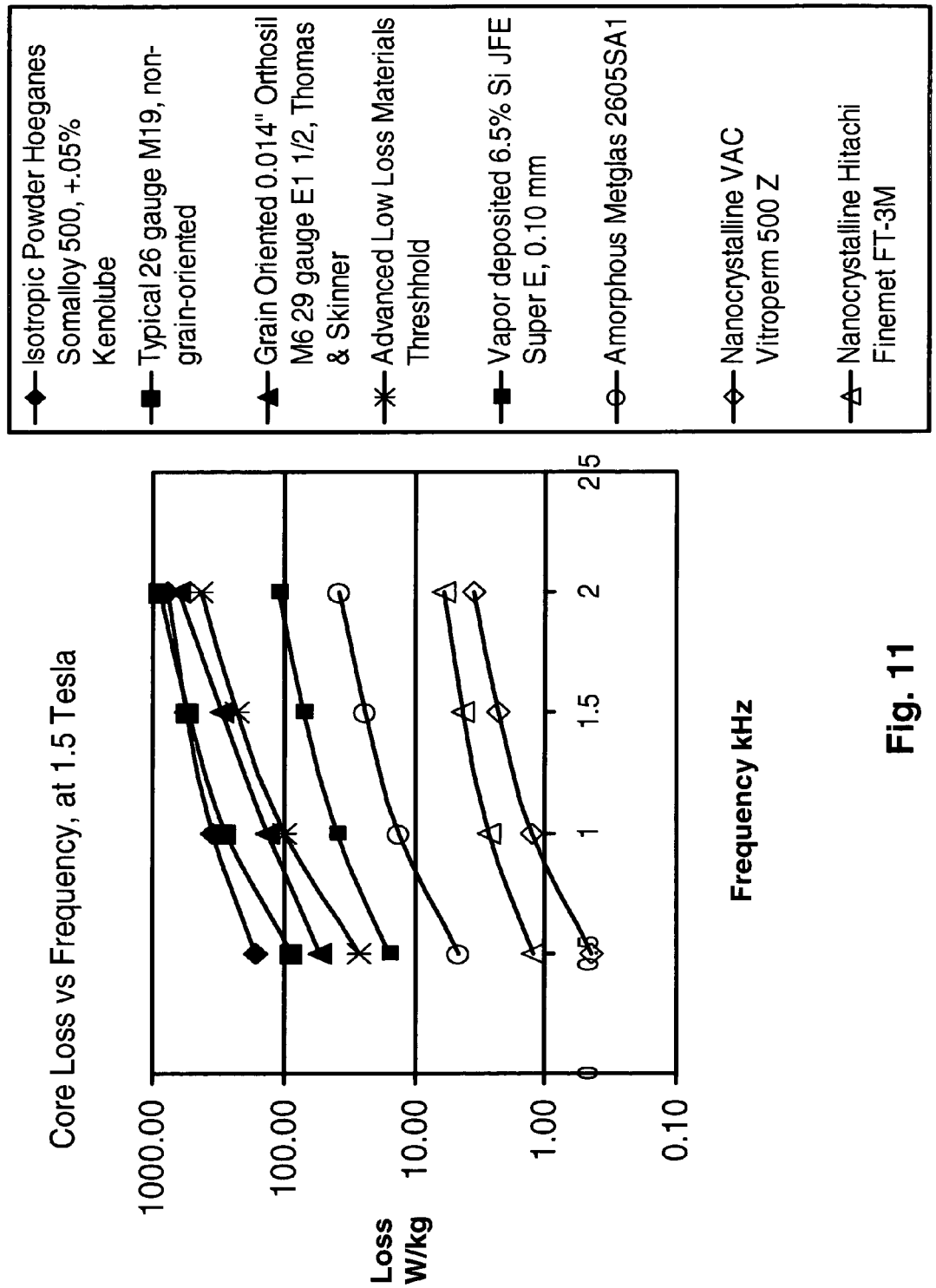
FIG. 11: Chart of core loss of various soft magnetic materials versus frequency, at 1.5 tesla.

FIG. 5b shows case 2: the motor according to the present invention has been re-designed to 36 poles to take advantage of high frequency operation, as proposed in this invention. The core losses are allowed to be such that the new attainable speed limit is similar to the conventional machine speed limit. However, as result of high frequency generated EMF, the corresponding ohmic loss for a given torque is much lower in this invention than in conventional machines, thus allowing the invention to increase the motor torque without exceeding thermal limits. Therefore, as a result of exploiting the properties of the low-loss material, the present invention out-performs the conventional motor.

The electric device of the present invention provides a torque-speed curve with a significant increase in the amount of area under the curve as compared to a conventional device. Increased area under the curve indicates that more and greater applications can now be reached for a given design. It is known the power increases linearly with speed. With the increased device speed and constant torque as provided by this invention, the device has a greater power density, i.e., more power for fixed size. In both case 1 and 2 presented above, the motor of this invention outperforms the conventional motor.

Total Harmonic Distortion

A further advantage of the present invention is that as the magnetic poles of the rotor arrangement pass across a stator pole the device of the present invention produces a clean sinusoidal curve with low total harmonic distortion (THD). THD is undesirable, in that it causes additional and non-productive current flow, which in turn causes additional heating. Low THD is relative, "good" designs are always less than 5%, and may be required to be lower than 1%. In addition, some regulatory agencies specify threshold THD values, which cannot be exceeded if regulatory approval is to be obtained. For example, certain THD values must be met in order to obtain a European CE mark.

An SSP ratio of 0.5 tends to produce a more sinusoidal output, which output can be further improved by the electronics. Since the present invention exploits the amorphous metal, nanocrystalline metal, optimized Si—Fe alloy, grain-oriented Fe-based material or non-grain-oriented Fe-based material advantageously to exploit the preferred value of SPP=0.5, then this tertiary benefit of low THD can be achieved, again through consideration of properly employing the material.

EXAMPLE

A motor has been designed according to the electric machine concepts described above. The magnetic core of the motor was formed from Metglas® alloy 2605SA1, and is slotted with 54 equally spaced teeth. The stator winding is a single layer of 26+/−1 turns of a coil with resistance of about 0.011 Ω at room temperature. The rotor assembly was constructed from 36 rotor magnets arranged with alternating polarity in a rotor plate. The rotor magnets are rare earth/iron/boron magnets with maximum energy product greater than 36 MGOe and intrinsic coercive force greater than 21 kOe. Performance characteristics of this electric machine are set forth table 4 below:

TABLE 4

EXEMPLARY PERFORMANCE

| | | |
|---|---|---|
| Inverter | 320 | Vrms line |
| Real Output Power | 80852 | Watts |
| Shaft torque | 214 | N-m |
| Speed | 3600 | rpm |
| Efficiency | 94% | |
| Machine Cooling | Liquid | |
| Pole Pairs | 18 | |
| Slots per Stator | 54 | |
| Overall Machine Size | | |
| Outside Diameter | 308 | mm |
| Length | 117 | mm |
| Electrical, Phase Properties | | |
| Ke | 66 | Vrms/krpm line |
| Ke | 0.363 | V-s |
| THD of Ke | 2.9% | |
| Resistance | 11.8 | m-ohm |
| Inductance | 85.8 | u-H |
| Active Material Mass | | |
| NdFeB Magnet | 2.0 | kg |
| Copper | 3.7 | kg |
| Amorphous Metal | 19.1 | kg |

One skilled in the art will readily appreciate that the present invention is well adapted to carry out the objects and obtain the ends and advantages mentioned, as well as those inherent therein. The electric devices described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, although axial gap electric machines have been generally described herein, other types of electric machines may be designed according to the principles disclosed herein, such as radial gap machines or linear machines. Furthermore, the electric machines could include a number of electric machines other than permanent magnet machines, such as induction machines, synchronous machines, synchronous reluctance machines, switch reluctance machines, and dc electromagnet machines. In addition, other types of rotors and/or stator winding schemes are all within the scope of the present invention. Thus, such additional embodiments are within the scope of the present invention and the following claims.

Where a component or limitation is described with a variety of different possible numbers or dimensions associated with that component or limitation, in additional embodiments, the component or limitation is in a range specified by taking any two of the particular values provided as the endpoints of the range. The range includes the endpoints unless clearly indicated to the contrary.

What is claimed is:

1. An electro-magnetic device comprising:
   (a) at least one stator assembly including a unitary magnetic core formed from a low-loss soft-magnetic material, wherein said unitary magnetic core includes a number of slots, and wherein said slots are wound with stator windings; and
   (b) at least one magnetic field assembly including a plurality of poles, said magnetic field assembly arranged and disposed for magnetic interaction with the at least one stator,
   wherein the low loss soft-magnetic material is characterized by a core loss less than "L" where L is given by the formula $L=12 \cdot f \cdot B^{1.5}+30 \cdot f^{2.3} \cdot B^{2.3}$, where
   L is the loss in W/kg,
   f is the frequency in KHz, and
   B is the magnetic flux density in peak Tesla; and
   wherein a frequency of said electro-magnetic device is higher than 300 Hz during operation of the device.

2. The device of claim 1 wherein said device is an axial-airgap device.

3. The device of claim 1 wherein the frequency of said electro-magnetic device is greater than about 400 Hz during operation of the device.

4. The device of claim 1 wherein the frequency of the device is between 400 Hz and 1000 Hz during operation of the device.

5. The device of claim 1 wherein the frequency of the device is about 1000 Hz during operation of the device.

6. The device of claim 1 wherein the low loss soft magnetic material is amorphous metal.

7. The device of claim 1 wherein the low loss soft magnetic material is nanocrystalline metal.

8. The device of claim 1 wherein the low loss soft magnetic material is optimized Si—Fe alloy.

9. The device of claim 1 wherein the unitary magnetic core is also a unibody magnetic core.

10. The device of claim 1 wherein the slots per phase per pole of the device is about 0.5.

11. The device of claim 1 wherein the magnetic field assembly is a rotor.

12. The device of claim 1 wherein the plurality of poles is greater than 4 at speeds greater than about 12,000 revolutions per minute.

13. A method of manufacturing an electro-magnetic device comprising:
   (a) selecting a low loss soft-magnetic material that is characterized by a core loss less than "L" where L is given by the formula
   $$L=12 \cdot f \cdot B^{1.5}+30 \cdot f^{2.3} \cdot B^{2.3}, \text{ where}$$
   L is the loss in W/kg,
   f is the frequency in KHz, and
   B is the magnetic flux density in peak Tesla;
   (b) providing at least one stator assembly including a unitary magnetic core formed from the low-loss soft-magnetic material;
   (c) providing stator windings in said slots; and
   (d) providing at least one magnetic field assembly, the at least one magnetic assembly including a plurality of poles for magnetically interacting with the stator windings.

14. The method of claim 13 wherein said electro-magnetic device is an axial-airgap device.

15. The method of claim 13 wherein the plurality of poles includes thirty-six poles.

16. The method of claim 13 wherein the plurality of poles is greater than 4 at speeds greater than about 12,000 revolutions per minute.

17. The method of claim 13 wherein the slots per phase per pole of the device is about 0.5.

18. The method of claim 13 wherein the low loss soft magnetic material is amorphous metal.

19. The method of claim 13 wherein the low loss soft magnetic material is nanocrystalline metal.

20. The method of claim 13 wherein the low loss soft magnetic material is Si—Fe alloy.

21. The method of claim 13 wherein the unitary magnetic core is also a unibody magnetic core.

22. An electro-magnetic device comprising:
(a) at least one stator assembly including a unibody magnetic core formed from a low-loss soft-magnetic material, wherein said unibody magnetic core includes a number of slots, and wherein said slots are wound with stator windings; and
(b) at least one magnetic field assembly including a plurality of poles, said magnetic field assembly arranged and disposed for magnetic interaction with the at least one stator,
wherein the low loss soft-magnetic material is characterized by a core loss less than "L" where L is given by the formula $L=12 \cdot f \cdot B^{1.5}+30 \cdot f^{2.3} \cdot B^{2.3}$, where
L is the loss in W/kg,
f is the frequency in KHz, and
B is the magnetic flux density in peak Tesla; and
wherein a frequency of said electro-magnetic device is higher than 300 Hz during operation of the device.

23. The device of claim 22 wherein said device is an axial-airgap device.

24. The device of claim 22 wherein the frequency of said electro-magnetic device is greater than about 400 Hz during operation of the device.

25. The device of claim 22 wherein the frequency of the device is between 400 Hz and 1000 Hz during operation of the device.

26. The device of claim 22 wherein the frequency of the device is about 1000 Hz during operation of the device.

27. The device of claim 22 wherein the low loss soft magnetic material is amorphous metal.

28. The device of claim 22 wherein the low loss soft magnetic material is nanocrystalline metal.

29. The device of claim 22 wherein the low loss soft magnetic material is optimized Si—Fe alloy.

30. The device of claim 22 wherein the slots per phase per pole of the device is about 0.5.

31. The device of claim 25 wherein the plurality of poles includes 36 poles.

32. The device of claim 22 wherein the plurality of poles is greater than 4 at speeds greater than about 12,000 revolutions per minute.

33. The device of claim 25 wherein the magnetic field assembly is a rotor.

34. A method of manufacturing an electro-magnetic device comprising:
(a) selecting a low loss soft-magnetic material that is characterized by a core loss less than "L" where L is given by the formula $$L=12 \cdot f \cdot B^{1.5}+30 \cdot f^{2.3} \cdot B^{2.3}, \text{ where}$$

L is the loss in W/kg,
f is the frequency in KHz, and
B is the magnetic flux density in peak Tesla;
(b) providing at least one stator assembly including a unibody magnetic core formed from the low-loss soft-magnetic material;
(c) providing stator windings in said slots; and
(d) providing at least one magnetic field assembly, the at least one magnetic field assembly including a plurality of poles for magnetically interacting with the stator windings.

35. The method of claim 34 wherein said electro-magnetic device is an axial-airgap device.

36. The method of claim 34 wherein the plurality of poles includes thirty-six poles.

37. The method of claim 34 wherein the plurality of poles is greater than 4 at speeds greater than about 12,000 revolutions per minute.

38. The method of claim 34 wherein the slots per phase per pole of the device is about 0.5.

39. The method of claim 34 wherein the low loss soft magnetic material is amorphous metal.

40. The method of claim 34 wherein the low loss soft magnetic material is nanocrystalline metal.

41. The method of claim 34 wherein the low loss soft magnetic material is Si—Fe alloy.

42. The method of claim 34 wherein the magnetic field assembly is a rotor.

* * * * *